(12) United States Patent
Sullivan et al.

(10) Patent No.: US 11,933,585 B2
(45) Date of Patent: Mar. 19, 2024

(54) METHOD AND APPARATUS FOR IMPROVING THE AIM OF A WEAPON STATION, FIRING A POINT-DETONATING OR AN AIR-BURST PROJECTILE

(71) Applicant: NOSTROMO HOLDINGS, LLC, Alexandria, VA (US)

(72) Inventors: Kevin Michael Sullivan, Kennebunk, ME (US); Torgrim Jorgensen, Kennebunkport, ME (US)

(73) Assignee: NOSTROMO HOLDINGS, LLC, Alexandria, VA (US)

( * ) Notice: Subject to any disclaimer, the term of this patent is extended or adjusted under 35 U.S.C. 154(b) by 90 days.

(21) Appl. No.: 17/514,463

(22) Filed: Oct. 29, 2021

(65) Prior Publication Data
US 2022/0128336 A1 Apr. 28, 2022

Related U.S. Application Data

(60) Continuation-in-part of application No. 16/682,202, filed on Nov. 13, 2019, now Pat. No. 11,187,496,
(Continued)

(51) Int. Cl.
| | |
|---|---|
| *F41G 3/14* | (2006.01) |
| *F41G 3/02* | (2006.01) |
| *F41G 3/06* | (2006.01) |
| *F41G 3/12* | (2006.01) |
| *F41G 3/22* | (2006.01) |

(Continued)

(52) U.S. Cl.
CPC ............. *F41G 3/142* (2013.01); *F41G 3/02* (2013.01); *F41G 3/06* (2013.01); *F41G 3/12* (2013.01); *F41G 3/22* (2013.01); *F42C 13/026* (2013.01); *F42C 13/047* (2013.01); *F42C 13/08* (2013.01); *F42B 12/20* (2013.01); *F42B 12/202* (2013.01)

(58) Field of Classification Search
CPC ..... F41G 3/02; F41G 3/06; F41G 3/12; F41G 3/14; F41G 3/22; F42C 13/02; F42C 13/04; F42C 13/08
See application file for complete search history.

(56) References Cited

U.S. PATENT DOCUMENTS

| | | | |
|---|---|---|---|
| 3,019,073 | A | 1/1962 | Hall |
| 3,633,212 | A | 1/1972 | Cooper |

(Continued)

FOREIGN PATENT DOCUMENTS

| | | | |
|---|---|---|---|
| CA | 2082448 A1 | 5/1994 | |
| DE | 3603521 A1 | 8/1987 | |

(Continued)

*Primary Examiner* — Thien M Le
(74) *Attorney, Agent, or Firm* — Philip E. Levy; Taera K. Franklin; Eckert Seamans Cherin & Mellott, LLC

(57) ABSTRACT

The method and apparatus for a remote weapon station or incorporated into manually-aimed weapons. The methodology requires use of a muzzle velocity sensor that refines the aiming of the second and subsequent fires or volleys fired from weapon systems. When firing the first volley a weapon uses an estimated velocity and, at firing, the muzzle velocity of a projectile is measured. When firing the second volley a weapon's fire control calculates an aiming point using the measured velocity of the first volley.

15 Claims, 51 Drawing Sheets

Related U.S. Application Data which is a division of application No. 15/860,792, filed on Jan. 3, 2018, now Pat. No. 10,514,234, which is a continuation-in-part of application No. 15/200,023, filed on Jul. 1, 2016, now Pat. No. 9,879,963, which is a continuation-in-part of application No. 14/829,839, filed on Aug. 19, 2015, now Pat. No. 9,600,900, which is a continuation-in-part of application No. 14/227,054, filed on Mar. 27, 2014, now abandoned.

(60) Provisional application No. 61/805,534, filed on Mar. 27, 2013.

(51) Int. Cl.
*F42C 13/02* (2006.01)
*F42C 13/04* (2006.01)
*F42C 13/08* (2006.01)
*F42B 12/20* (2006.01)

(56) References Cited

U.S. PATENT DOCUMENTS

| | | |
|---|---|---|
| 3,659,201 A | 4/1972 | Vogelsang |
| 4,228,397 A | 10/1980 | Schmidt |
| 4,342,961 A | 8/1982 | Zimmermann et al. |
| 4,483,190 A | 11/1984 | Cornett |
| 4,486,710 A | 12/1984 | Schmidt |
| 4,524,323 A | 8/1985 | Schmidt |
| 4,677,376 A | 6/1987 | Ettel et al. |
| 4,818,104 A | 4/1989 | Hartman |
| 4,862,785 A | 9/1989 | Ettel et al. |
| 4,864,515 A | 9/1989 | Deck |
| 4,928,523 A | 5/1990 | Muhrer et al. |
| 5,026,158 A | 6/1991 | Golubic |
| 5,159,396 A | 10/1992 | Yuhas |
| 5,233,901 A | 8/1993 | Nilsson et al. |
| 5,267,502 A | 12/1993 | Gent et al. |
| 5,685,504 A | 11/1997 | Schneider et al. |
| 5,814,756 A | 9/1998 | Boss |
| 5,827,958 A | 10/1998 | Sigler |
| 5,834,675 A | 11/1998 | Boss |
| 6,138,547 A | 10/2000 | Larsson et al. |
| 6,170,377 B1 | 1/2001 | Larsson et al. |
| 6,216,595 B1 | 4/2001 | Lamorlette et al. |
| 6,615,739 B2 | 9/2003 | Gibson et al. |
| 6,644,111 B2 | 11/2003 | Cytron et al. |
| 6,666,089 B2 | 12/2003 | Dilz, Jr. |
| 6,752,137 B2 | 6/2004 | Brunette et al. |
| 6,898,971 B2 | 5/2005 | Dilz |
| 8,074,555 B1 | 12/2011 | Sullivan et al. |
| 8,286,872 B2 | 10/2012 | Laupstad et al. |
| 8,305,071 B2 | 11/2012 | Frick |
| 8,499,693 B2 | 8/2013 | Sullivan et al. |
| 8,800,359 B2 | 8/2014 | Furch et al. |
| 9,600,900 B2 | 3/2017 | Sullivan |
| 10,288,398 B1 * | 5/2019 | Verini ............... F42B 5/145 |
| 11,594,141 B1 * | 2/2023 | Barnawi ............ G08G 5/0082 |
| 2005/0126379 A1 | 6/2005 | Pikus et al. |
| 2005/0126380 A1 | 6/2005 | Ettmuller |
| 2005/0241203 A1 | 11/2005 | Lizotte |
| 2009/0289619 A1 | 11/2009 | Frick |
| 2011/0297742 A1 | 12/2011 | Sullivan et al. |
| 2012/0085162 A1 | 4/2012 | Furch et al. |
| 2012/0105832 A1 | 5/2012 | Streuber |
| 2012/0125092 A1 | 5/2012 | Downing |
| 2012/0143551 A1 | 6/2012 | Burkland |
| 2014/0007760 A1 | 1/2014 | Frick |
| 2014/0060298 A1 | 3/2014 | Mueller |
| 2015/0247714 A1 | 9/2015 | Teetzel |
| 2015/0301169 A1 * | 10/2015 | De Pasquale ...... G01S 13/723 342/146 |
| 2015/0310627 A1 * | 10/2015 | Moraites .............. H04N 23/69 382/103 |
| 2016/0069644 A1 * | 3/2016 | Bell ..................... F41G 3/02 89/204 |
| 2016/0145865 A1 * | 5/2016 | Shackelford ......... B32B 5/245 52/745.1 |
| 2016/0169621 A1 * | 6/2016 | Geva ................... F41G 1/44 42/118 |
| 2016/0217325 A1 * | 7/2016 | Bose ................... G11B 27/17 |
| 2021/0063120 A1 * | 3/2021 | Taveniku ............ G06V 20/52 |
| 2021/0280088 A1 * | 9/2021 | Sedberry ............ G01D 21/02 |
| 2023/0113472 A1 * | 4/2023 | Gallery .............. G02B 27/017 463/5 |

FOREIGN PATENT DOCUMENTS

| | | |
|---|---|---|
| DE | 19719977 C1 | 10/1998 |
| EP | 0108973 B1 | 1/1987 |
| WO | 9851987 A1 | 11/1998 |
| WO | 2008048116 A1 | 4/2008 |
| WO | 2010108917 A | 9/2010 |
| WO | 2012131548 A1 | 10/2012 |

* cited by examiner

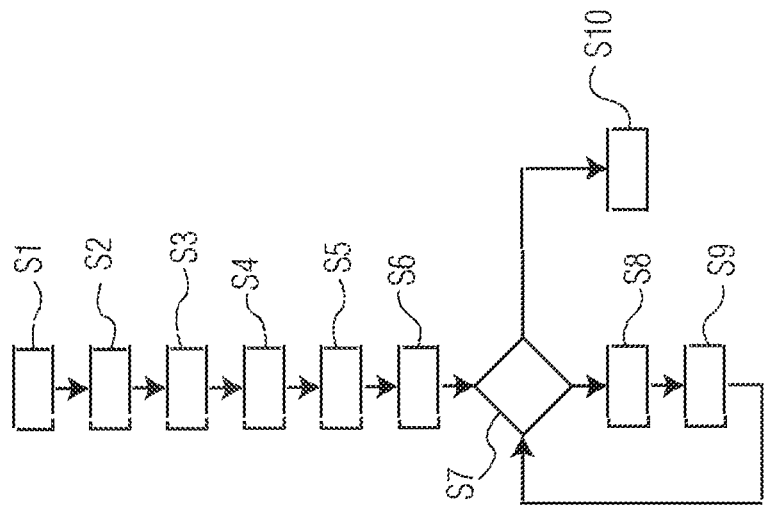
FIG. 1A
PRIOR ART
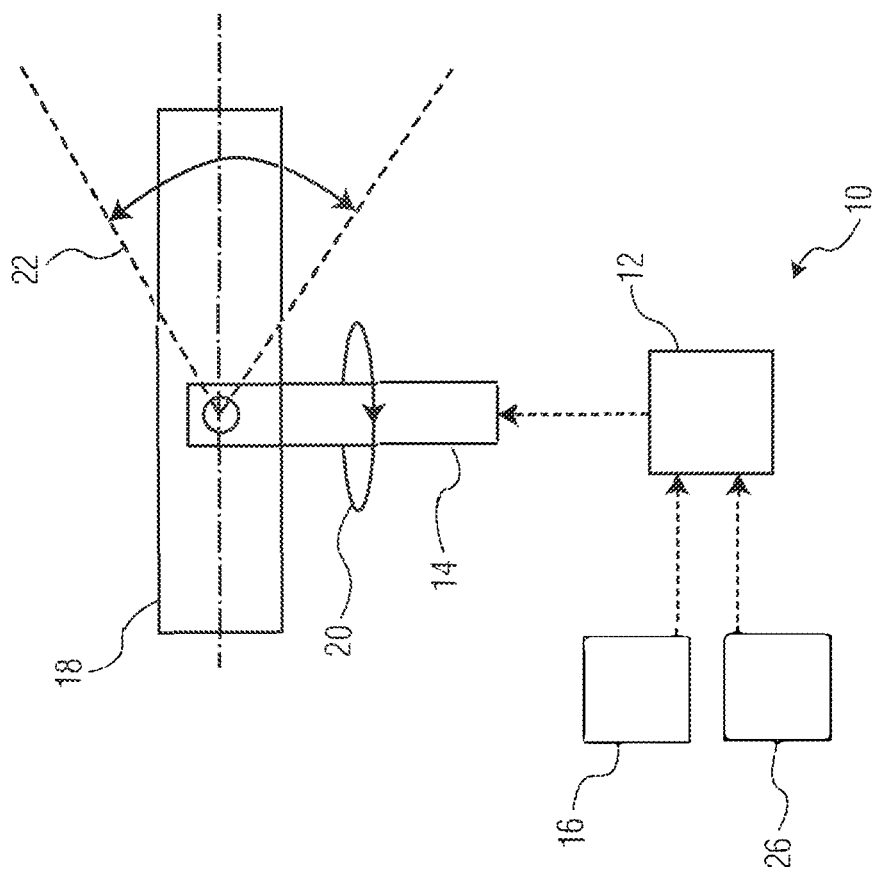

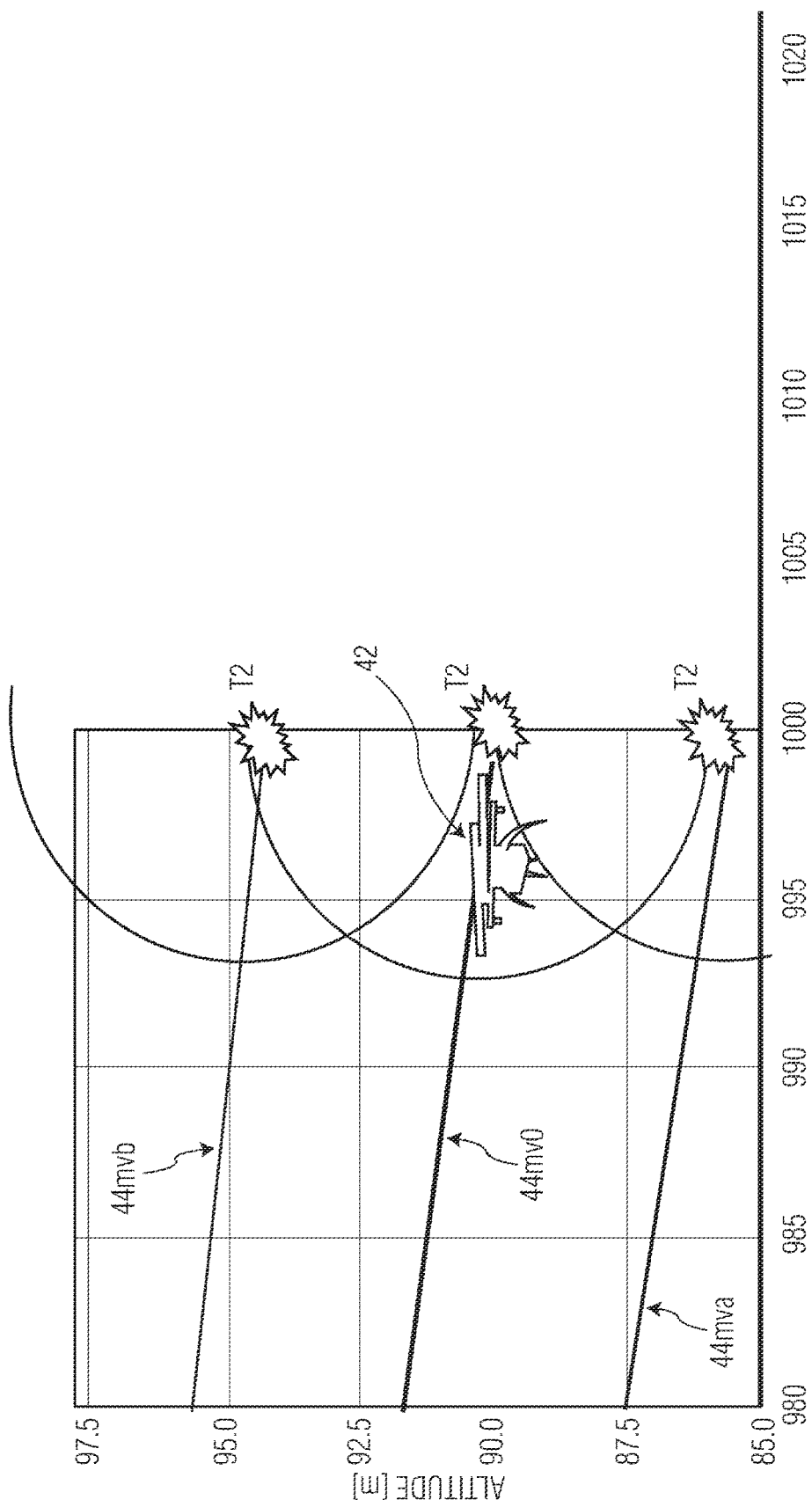

MODELING 40mm x 53 UNCORRECTED VOLLEYS

| MEAN LOT MUZZLE VELOCITY | AVERAGE MISS DISTANCE (IMPACT POINT) | ADJUSTED MISS DISTANCE (5 METER LETHAL RADIUS) |
|---|---|---|
| 237 METERS / SECOND | 24 METERS | 19 METERS |
| 238 METERS / SECOND | 18 METERS | 14 METERS |
| 239 METERS / SECOND | 10 METERS | 6 METERS |

FIG. 4H

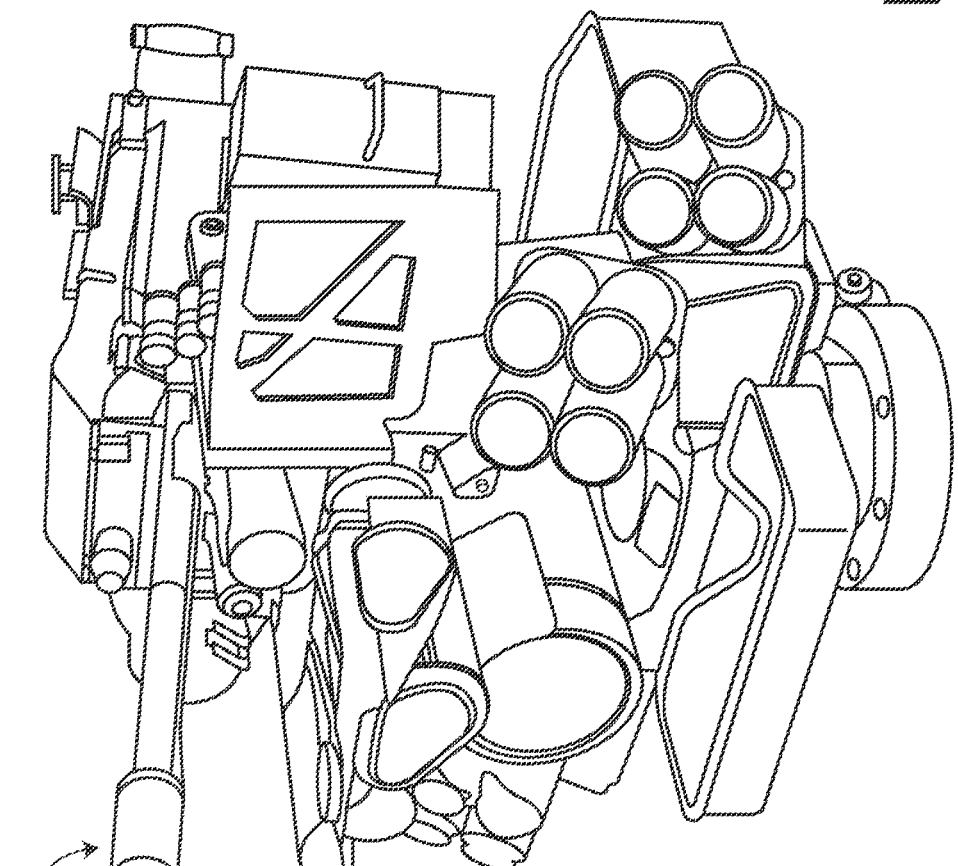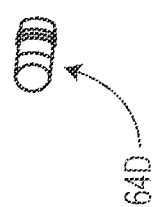
FIG. 2D

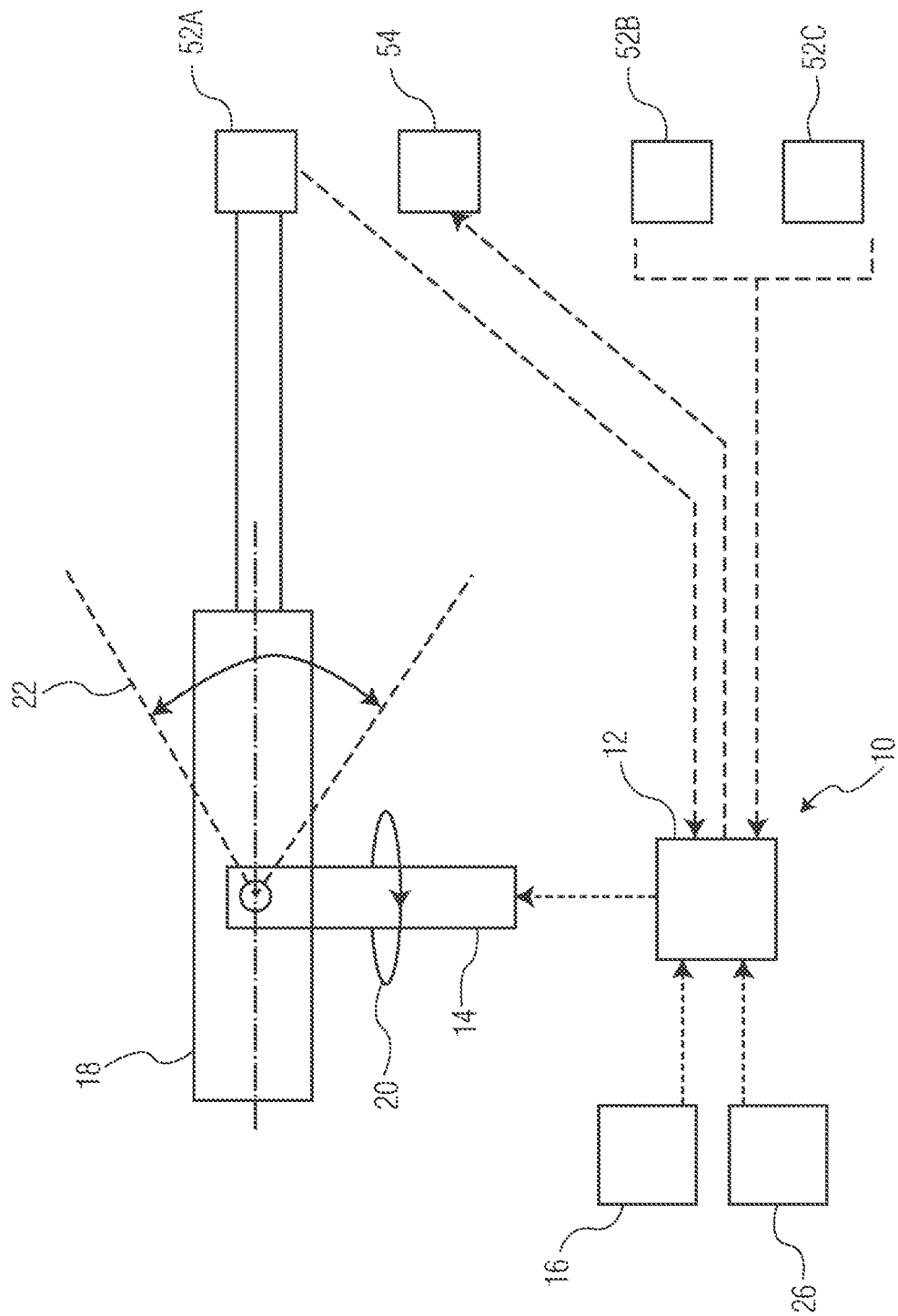

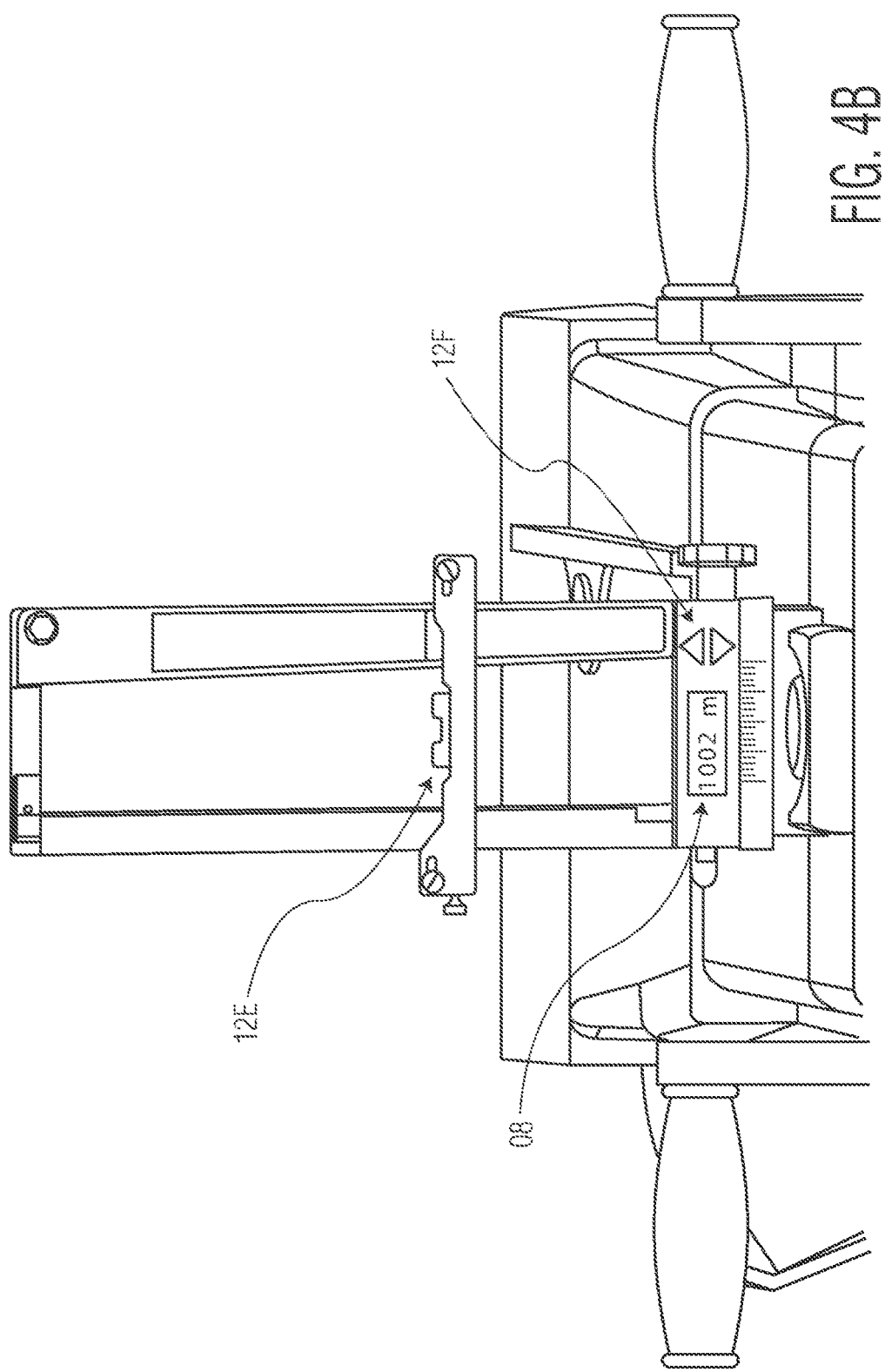

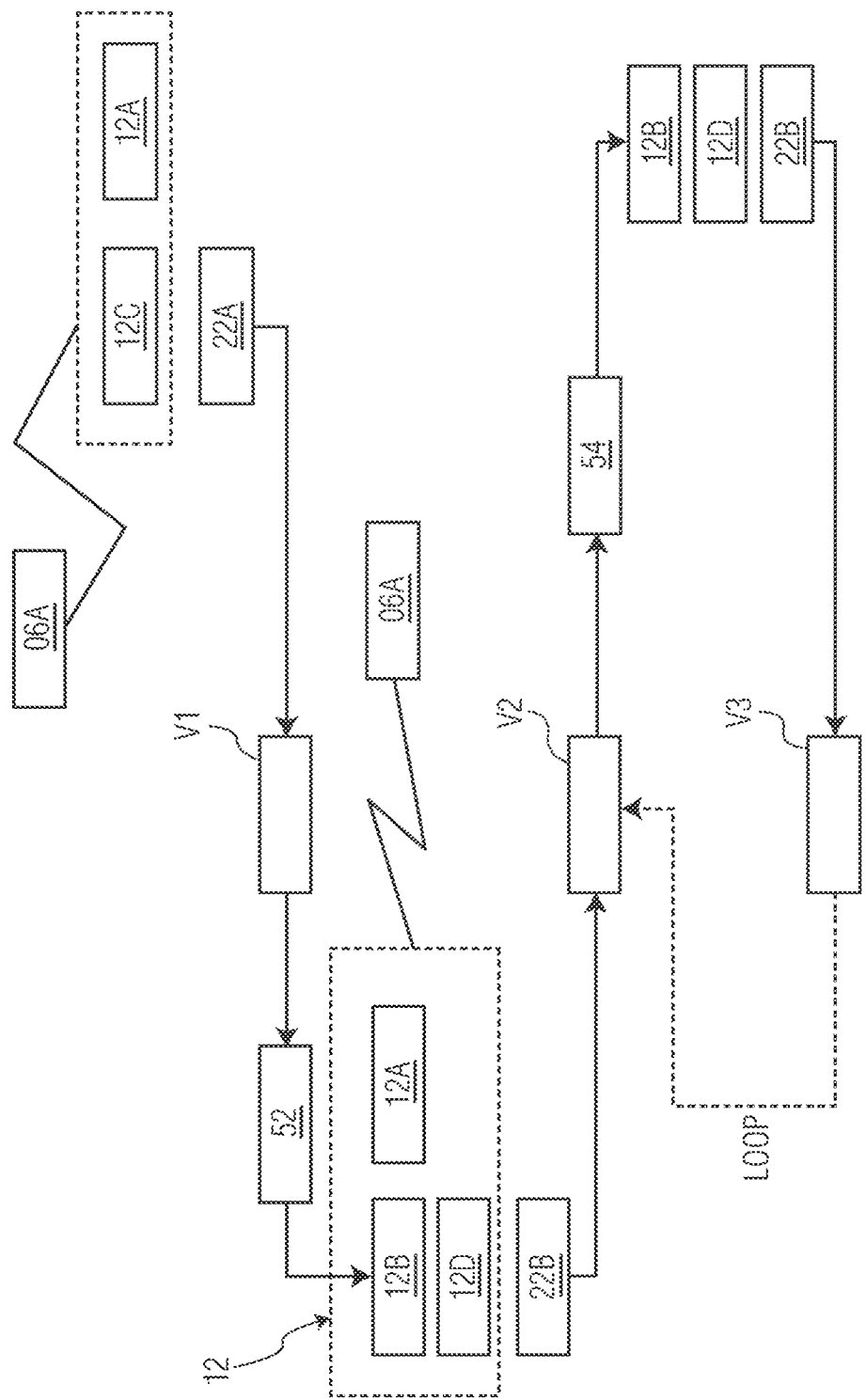

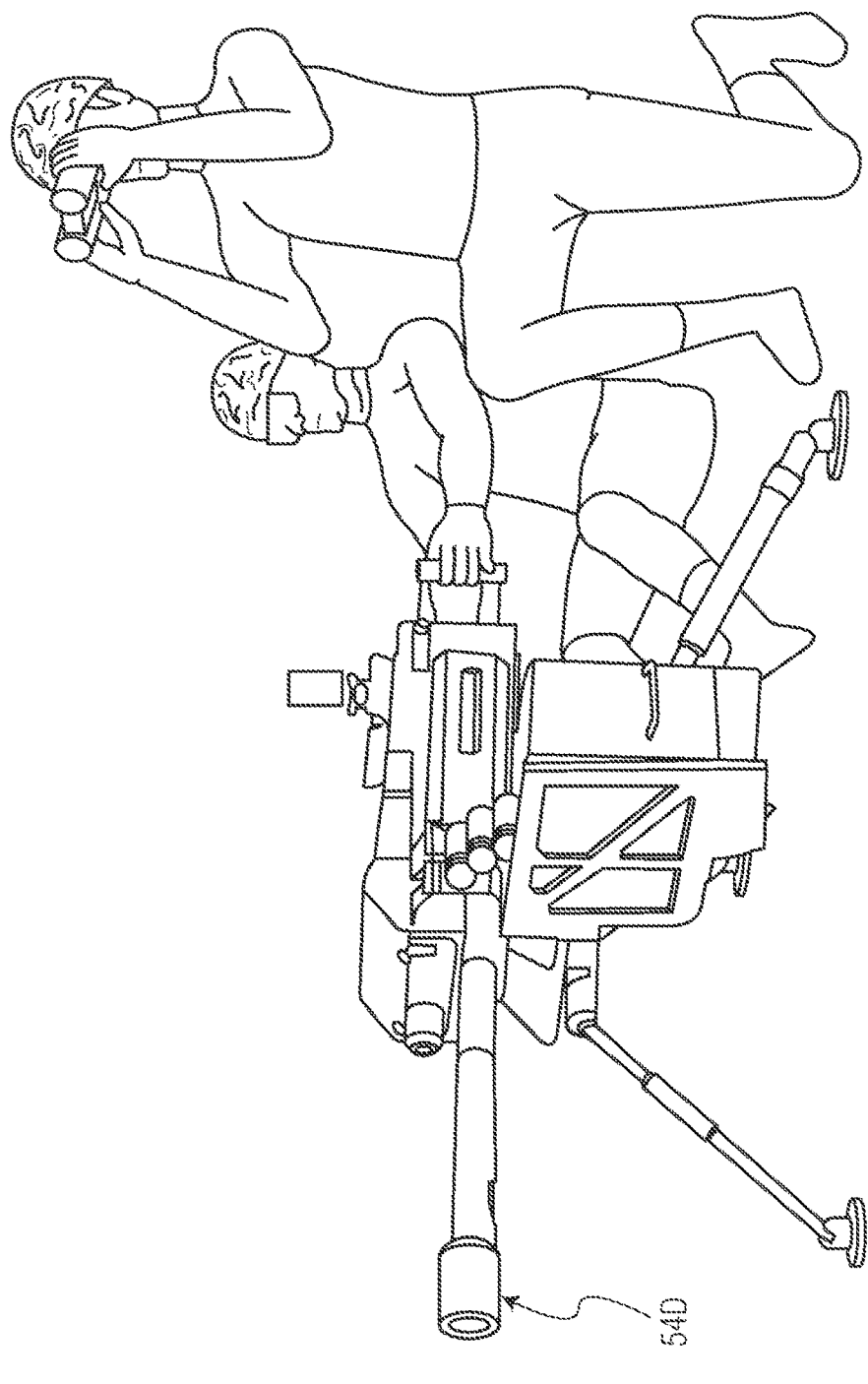
FIG. 4F

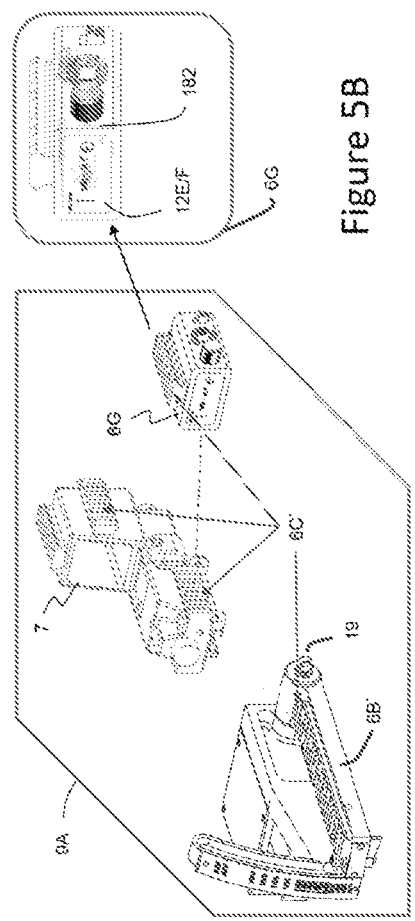

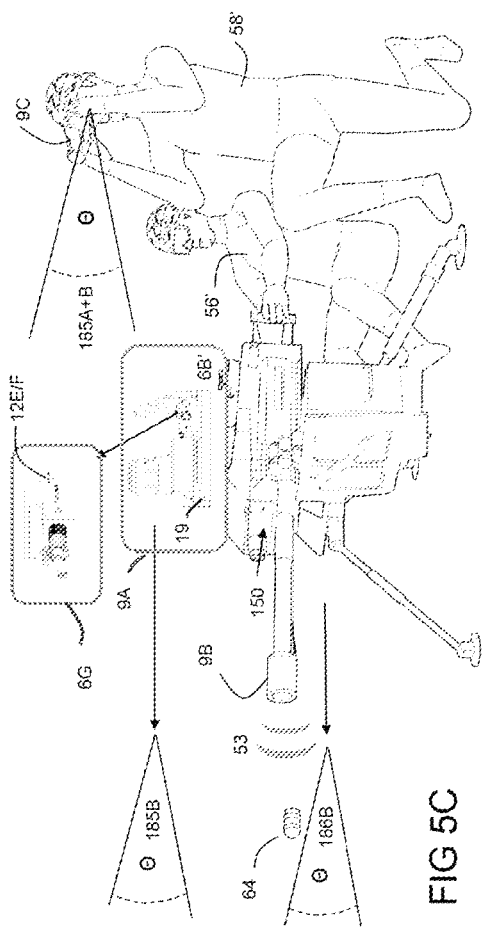

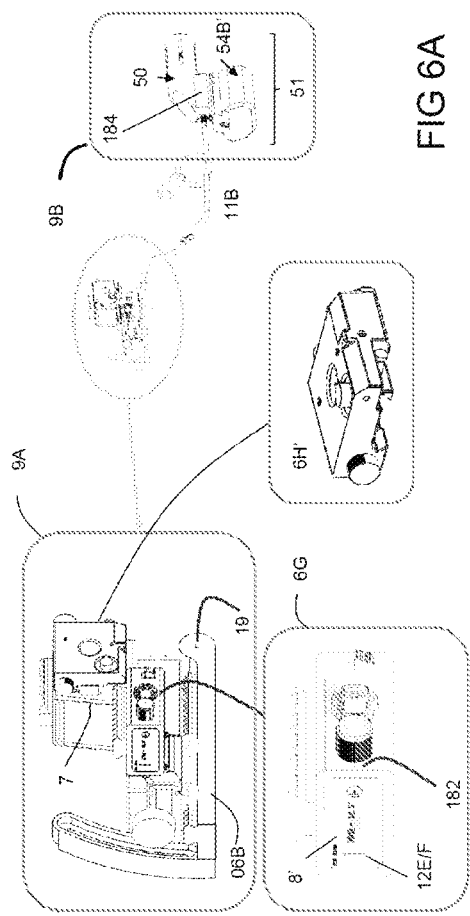

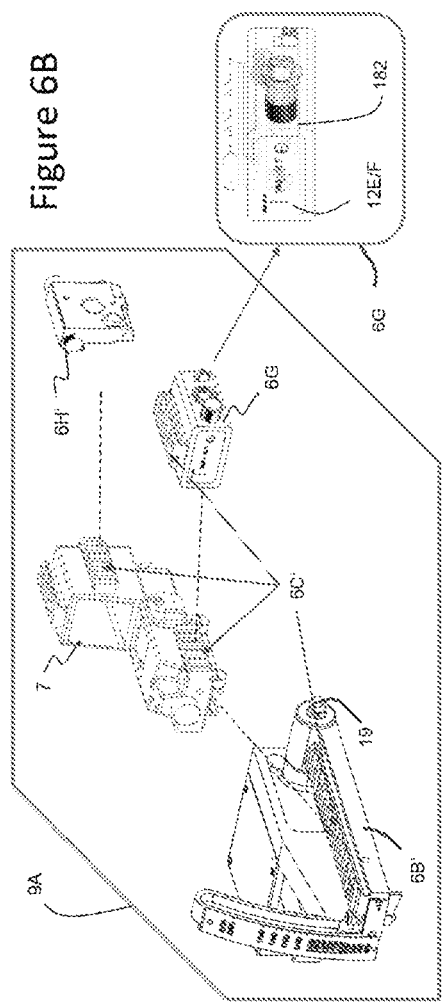

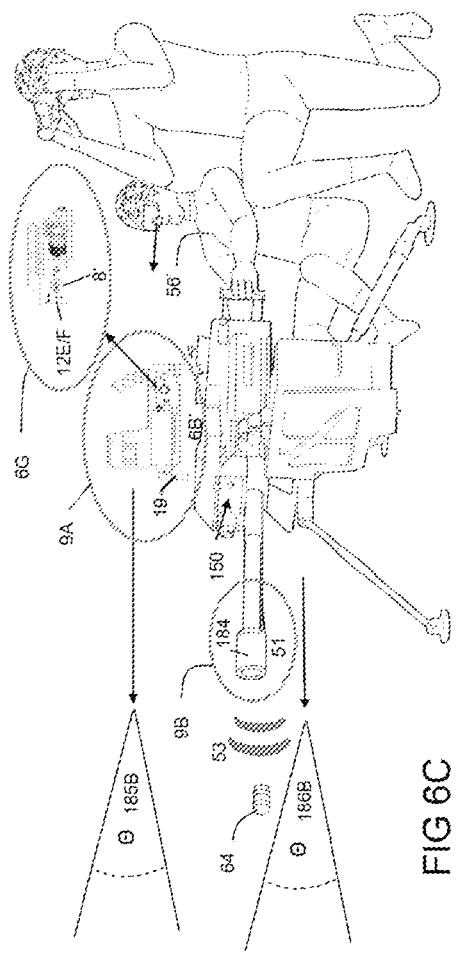

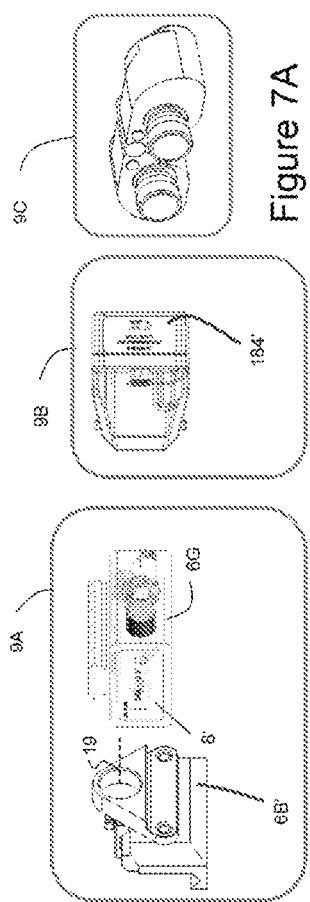

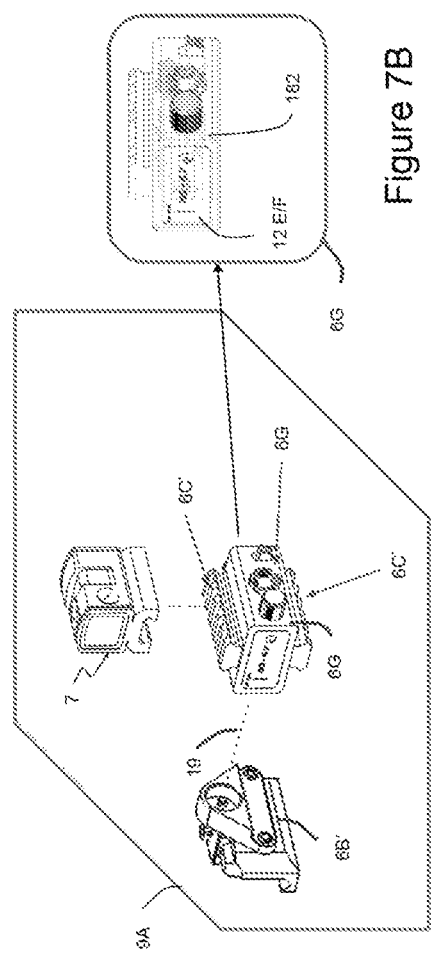

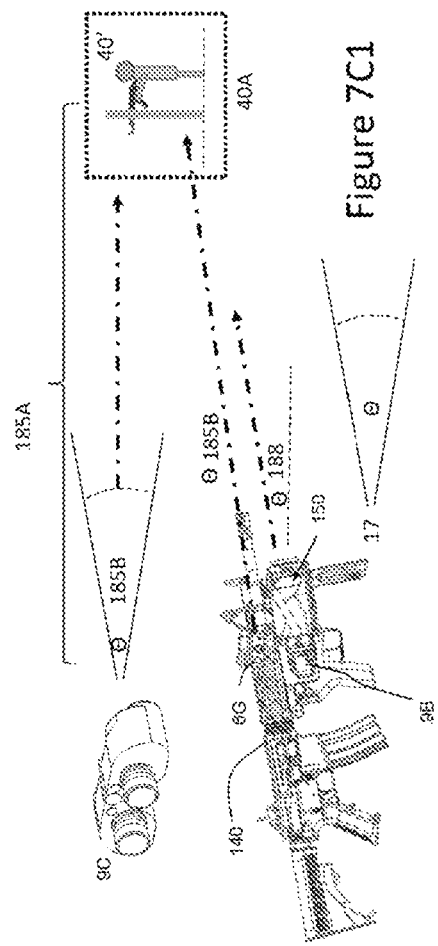

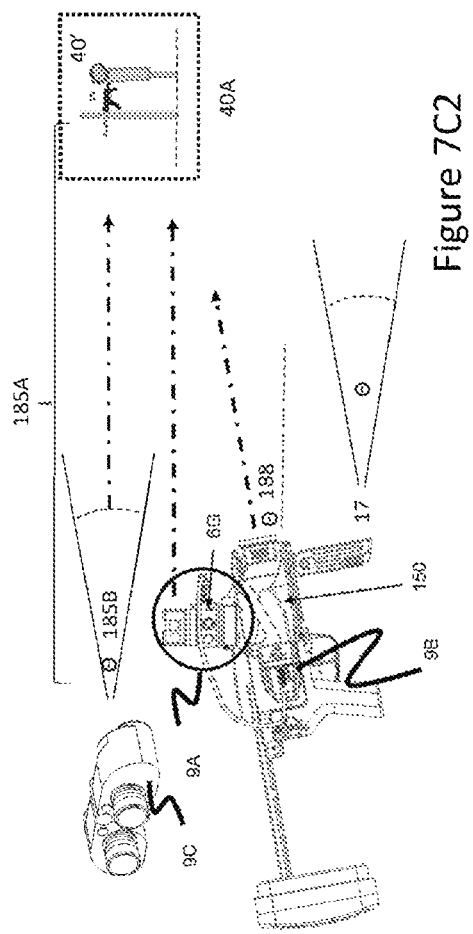
Figure 7C2

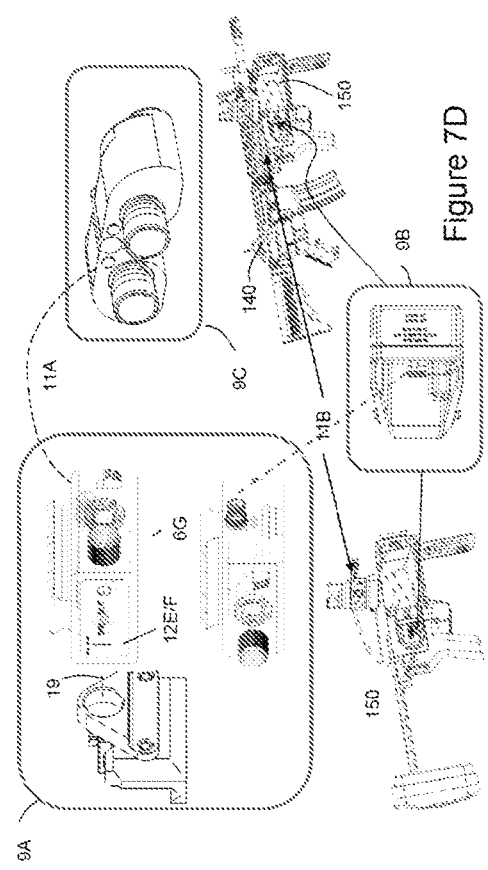

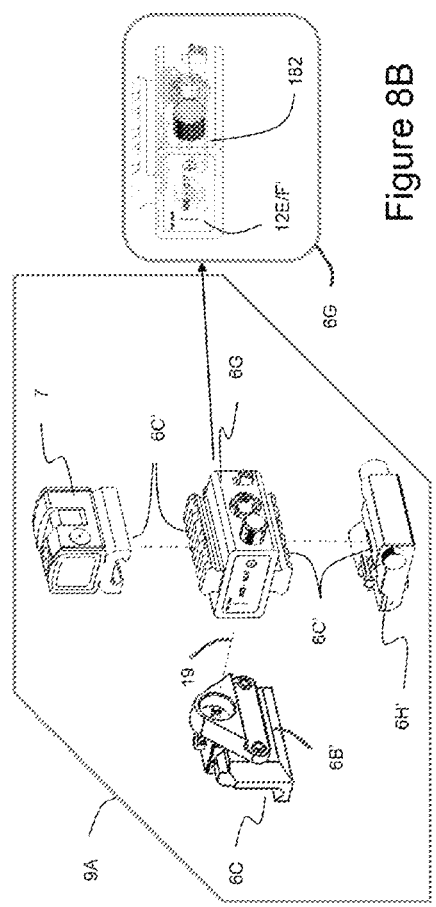

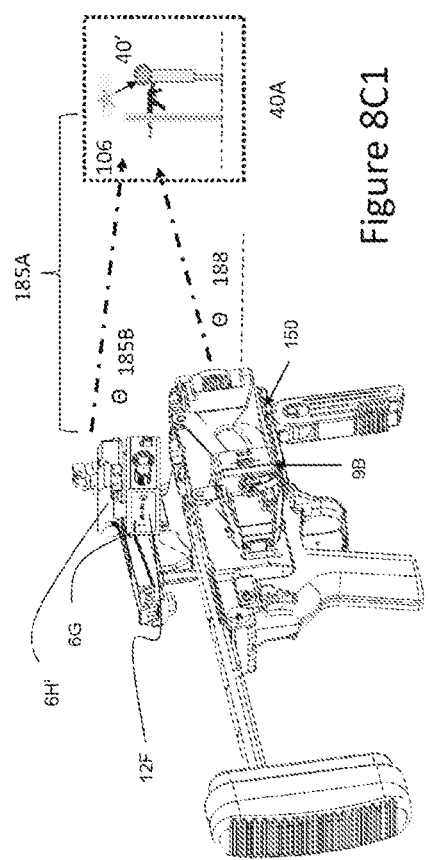
Figure 8C1

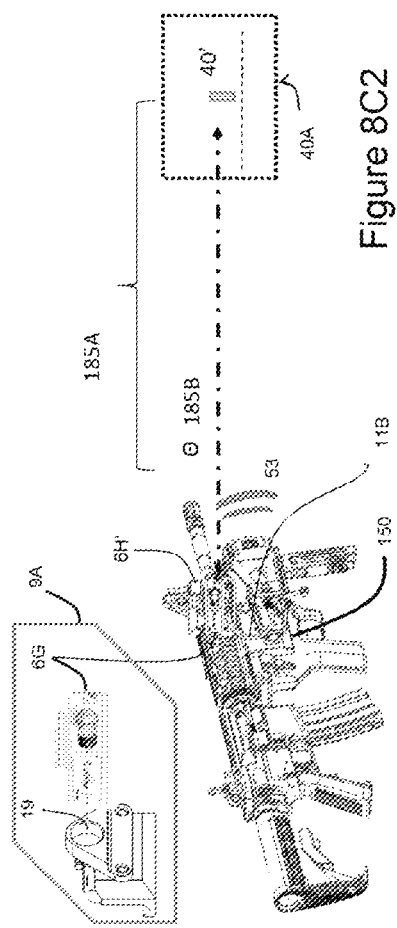

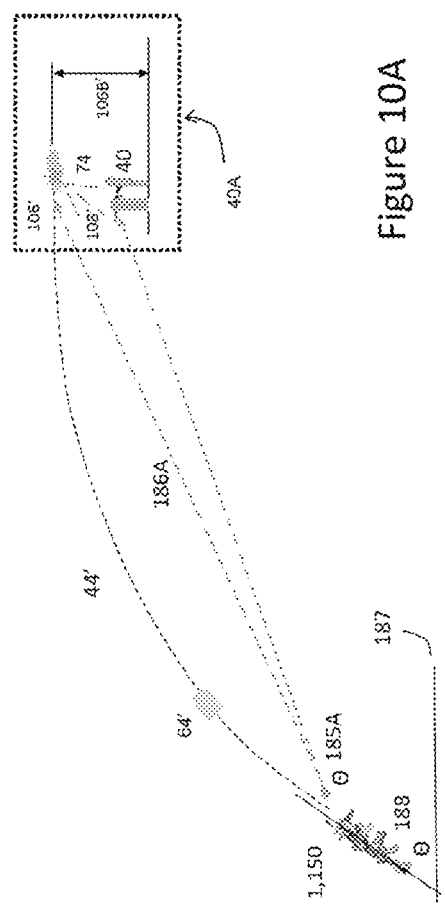

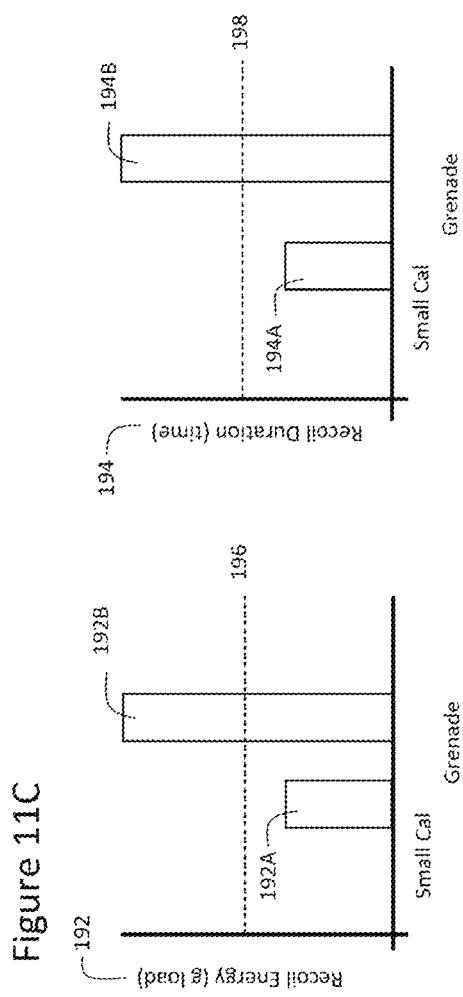

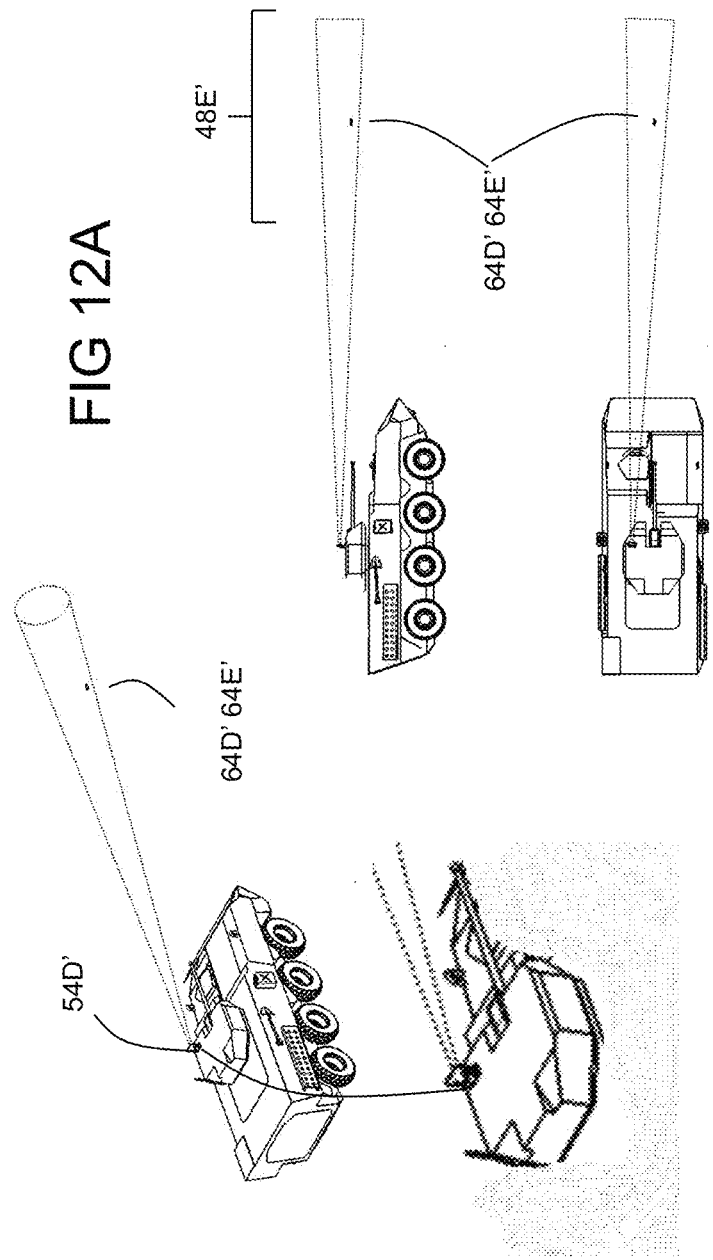

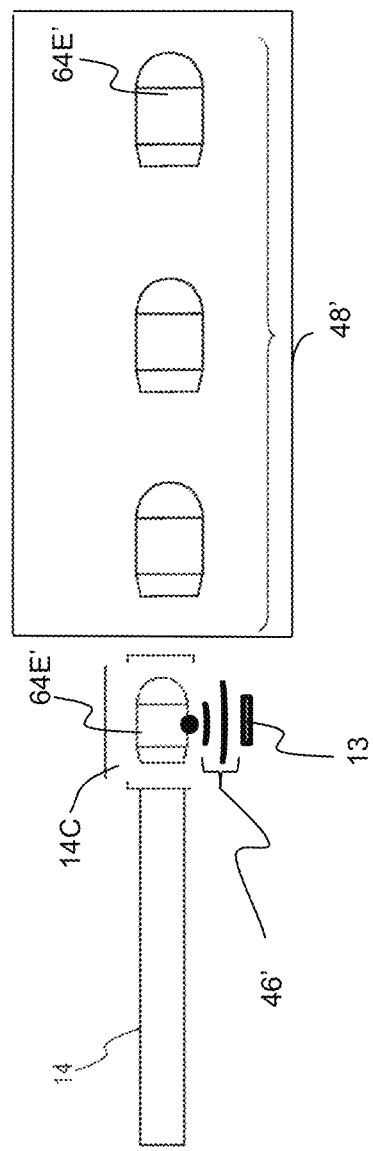

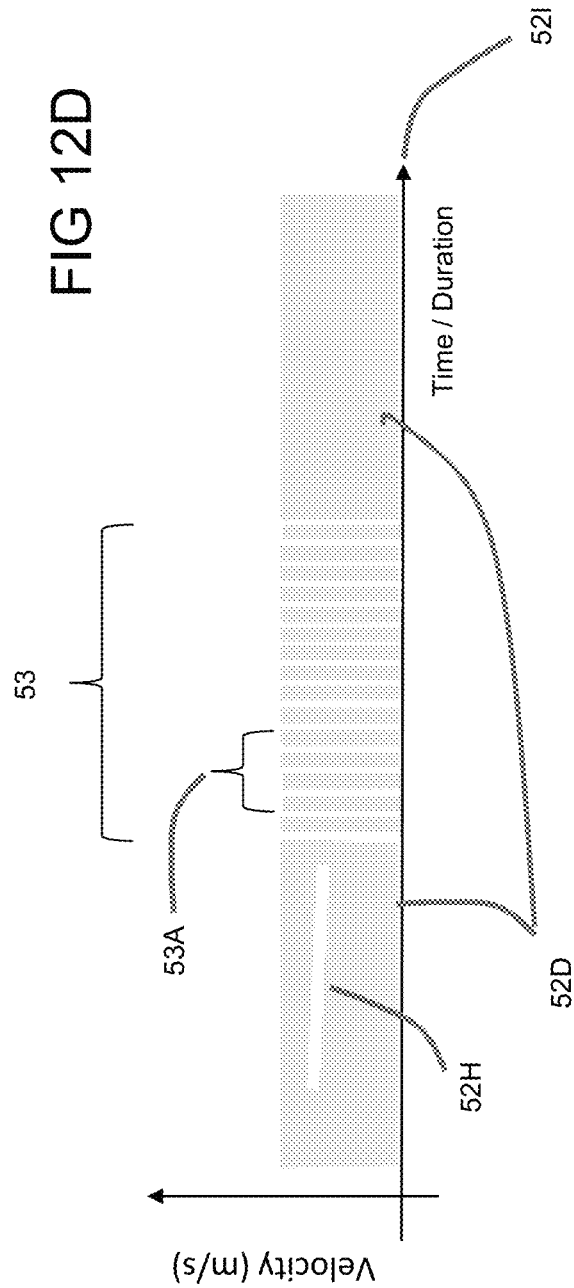

METHOD AND APPARATUS FOR IMPROVING THE AIM OF A WEAPON STATION, FIRING A POINT-DETONATING OR AN AIR-BURST PROJECTILE

CROSS-REFERENCE TO RELATED APPLICATIONS

This application is a continuation-in-part application of U.S. patent application Ser. No. 16/682,202 (Published as US 2020/0141697), which is a continuation application of U.S. patent application Ser. No. 15/860,792 (Published as US2018/0231354A1 and now U.S. Pat. No. 10,514,234), filed Jan. 3, 2018, which is a continuation-in-part of U.S. patent application Ser. No. 15/200,023, filed Jul. 1, 2016 (published as US 2017/0097216 and now U.S. Pat. No. 9,879,963), which application, in turn, is a continuation-in-part of U.S. patent application Ser. No. 14/829,839, filed Aug. 19, 2015 (published as US 2016/0055652 and now U.S. Pat. No. 9,600,900), which application, in turn, is a continuation-in-part of U.S. application Ser. No. 14/227,054, filed Mar. 27, 2014 (published as US 2016/0252335 and now abandoned) which, in turn, claims priority from the U.S. Provisional Application No. 61/805,534 filed Mar. 27, 2013. The present application claims priority from all of the aforementioned patent applications and from the Provisional Application No. 61/805,534 filed Mar. 27, 2013.

To the extent permitted by law, the disclosures of the aforementioned patent and patent applications are incorporated herein by reference. The disclosure of U.S. Pat. No. 8,286,872 is also incorporated herein by reference.

BACKGROUND OF THE INVENTION

The present invention relates to military fire control systems generally and, more specifically, to a system for adjusting the elevation and traverse of the gun barrel in a weapon or weapon station in dependence upon certain parameters, such as the measured muzzle velocity of a previously fired munition.

Remote Weapon Station:

By way of background, it is useful to consider the presently existing methods and systems of firing programmable ammunition from a so-called "remote weapon station" ("RWS"). When firing conventional ammunition an RWS Operator (1) ranges the target to ascertain the target range, and (2) elevates the barrel of the weapon to align reticules (whereupon the fire control computer identifies the elevation and deflection offsets using range tables or standard ballistic computation in an algorithm). The RWS Operator then (3) fires the first volley and (4) manually adjusts for subsequent (2-6) volleys, making adjustments (for that same target) based on the actual observed impact of the ammunition. When firing air-burst ammunition, the current practice requires the RWS Operator to (1) laze the target to ascertain the range, (2) elevate the weapon to align reticules (whereupon the fire control computer identifies the elevation, deflection offsets and a calculated air-burst time, corresponding to a standard muzzle velocity using range tables or standard ballistic computation in an algorithm). The RWS Operator then (3) fires the first volley and the gunner (4) manually adjusts the aim (for that same target), firing subsequent (2-6) volleys while making adjustments based on the actual observed impact of the ammunition.

Alternatively, weapons such as 40 mm Automatic Grenade Launchers (e.g., without limitation, the MK19) are configured to be fired by two-persons teams, with gunners and assistance gunners working in tandem to identify and fix targets and aim the weapon. For 40 mm hand held weapons, such as the US Army's M320 grenade launcher, kitted fire controls and programmers may be fit to a weapon. In all configurations firing air-burst 40 mm munitions, it is useful to configure distributed sub-systems structured to provide a terminal air-burst functionality, thereby offering improved aiming and firing of 40 mm grenades. Other alternate use of the kits may be incorporated into turreted vehicles, fit with medium-caliber cannons.

SUMMARY OF THE INVENTION

A principal objective of the present invention is to provide a method of operating a weapon station and a manually-controlled weapon station configuration to improve the precision delivery of both conventional and programmable munition projectiles.

The present invention provides an efficient method and weapon configuration where the muzzle velocity of a first volley is measured and the elevation to fire the second volley is automatically adjusted. This adjustment is coupled with the measurement of muzzle velocity and a programming technology, as is fully disclosed in the U.S. Pat. No. 9,600,900.

According to the present invention, the remote weapon station ("RWS") system is modified to fire both conventional and air-burst cartridges as herein set forth. When firing conventional ammunition, the RWS Operator (1) lazes the target to ascertain the range, and (2) elevates the weapon to align reticules (the fire control computer identifies the elevation and deflection offsets using range tables or standard ballistic computation in an algorithm). The RWS Operator then (3) fires the first volley and the RWS system (4) automatically adjusts the elevation for second and subsequent volleys (at that same target) using the computed average muzzle velocity of the fired volleys. When firing programmable air-burst ammunition the RWS Operator (1) lazes the target to ascertain the range, and (2) elevates the weapon to align reticules (the fire control computer identifies the elevation, deflection offsets and a calculated air-burst time corresponding to a standard muzzle velocity using range tables or standard ballistic computation in an algorithm). The RWS Operator then (3) fires the first volley of ABM ammunition using the expected flight time and the RWS system (4) automatically adjusts both the elevation and air-burst time of flight for second and subsequent volleys (at that same target) using the computed average muzzle velocity of the fired volleys.

RWS systems fire belted ammunition that is packaged into ammunition cans and placed in remote weapon stations. The operator has the choice to select different cartridges, as each type of cartridge in a military's inventory has unique external ballistics. When a can of ammunition is expended, the spent can is removed and replaced with a new can of ammunition. Each ammunition can houses ammunition cartridges derived from a single production lot of ammunition. Realizing that the variation of ammunition velocity, within an ammunition lot, has a narrower variation that the variation of ammunition lot to lot, the method of using the pre-set default muzzle velocity data for a $1^{st}$ volley from an ammunition can, and adjusting the $2^{nd}$ volley based on the actual measured muzzle velocity of the $1^{st}$ volley, provides for a practical means to improve the aim and terminal effect of ammunition.

Ammunition Programming Technologies:

It is also useful to understand projectile programming technologies that may be coupled to remote weapon stations and manually controlled weapon systems. The first air-burst technologies fielded by the Oerlikon and Bofors companies appeared in the late 1980s. Oerlikon's U.S. patents include U.S. Pat. Nos. 4,862,785; 5,814,756, and 5,834,675 describing what has been marketed as the AHEAD system. The disadvantage of using the "Oerlikon AHEAD" technique is that it consumes a great deal of power with each shot because the programming coils used in this technique are bulky and heavy.

To overcome this disadvantage, Bofors introduced the Programmable Barrel Weapon technology as disclosed in U.S. Pat. No. 6,138,547 and this programming technology was incorporated into the US MK47 weapon system produced by GDOTS in Saco, Maine. The published patent application US 2005/0126379 discloses RF data communication link for setting electronic fuzes. Whereas the programming of the projectile is only limited to pre-launch programming, the technique does not provide a method to program an in-flight projectile.

U.S. Pat. No. 6,216,595 discloses a process for the in-flight programming of the trigger time for a projectile element. The trigger time is transmitted via radio frequency signals which, unfortunately, admit to several disadvantages to effective transmission, such as interference from TED suppression technology. U.S. Pat. No. 6,170,377 to Bofors discloses a method and apparatus for transmission of programming data to the time fuze of a projectile via an inductive transmission coil. However, in the case of Oerlikon AHEAD, the inductive coils are very bulky and heavy. U.S. Pat. No. 6,138,547 discloses a method and system for programming fuzes using electric programming pulses to transmit data between a programmable fuze and a programming device. Due to oscillation of the projectile, it is difficult to maintain consistent contact or proximity between the external source of the programmed pulses and the conductor located on the projectile. Also, these various systems require extensive modification of the weapon design which limits their use. As the cost of power sources and the power consumption of electronics has dropped over time, a cost-effective approach to post-shot programming has become more practical. By programming post set-back, and in adjusting programming for exiting muzzle velocity these system have distinct operational advantages compared to programming pre-set back, where programming of ammunition does not account for muzzle velocity variations.

For example, U.S. Pat. No. 8,499,693 describes a system for optically programming ammunition; this system has been incorporated into the German Army DM131 cartridge with the US Army adapting the DM131 fuze in the XM1176 projectile and this system allows an integrator to measure muzzle velocity and program air-burst function based on the projectile's actual exit velocity. Further, some cases, incorporating unique RFID identifier's into a programmable fuze, allow for secure programming of a unique projectile in flight. Further, muzzle velocity measurement systems have been incorporated into artillery since the 1990s, and it is useful to incorporate interlaced programming commands into the microwave system, for the purpose of programming ammunition. Around the same time period, NAMMO introduced its radio programmed fuze.

The present invention provides a practical method and apparatus for improving the aim of both: (1) a remote weapon station or (2) configuration manually elevating a weapon, with hand held range finder, firing either conventional point-detonation ammunition cartridges or programmable air-burst munitions.

According to the invention, where a ballistic calculator in a fire control unit uses a pre-set default muzzle velocity ("MV") for a first shot or first volley fired from a given package or can of ammunition, the method comprises:
- (a) determining and inputting to the ballistic calculator a range to the target;
- (b) adjusting a barrel elevation by means of the ballistic calculator based on (1) the default MV for a projectile from the package or ammunition can and (2) the range to the target for a ballistic flight of the projectile toward the target;
- (c) firing at least one projectile from the package or ammunition can toward the target;
- (d) measuring an actual MV for the fired projectile(s) with a sensing device;
- (e) adjusting the barrel elevation by means of the ballistic calculator based on the actual MV data measured by the sensing device and the range to the target; and firing additional projectiles from the ammunition can toward a target.

Steps (e) through (f) are then repeated as often as desired.

The ammunition projectiles are retrieved, as needed, from an ammunition can stored on the remote weapon station. The projectiles in the can are conventionally linked together in a chain.

When a new can of ammunition is placed in use, the entire method is repeated, with the fire control's ballistic calculator setting a first fire control solution, a first elevation, using default muzzle velocity settings for each new can of ammunition.

According to a first preferred embodiment of the invention, the programmable air-burst projectiles have an optical sensor or modem that receives optical programming signals emitted from a transmitter electronically connected to, and physically adjacent to, the weapon station.

According to a second preferred embodiment of the invention, the programmable air-burst projectiles have an RF antenna that receives RF signals emitted from a transmitter electronically connected to, and physically adjacent to, the weapon station.

According to a third preferred embodiment of the invention, the programmable air-burst projectiles have a magnetic sensor that receives modulated electro-magnetic transmissions emitted from a magnetic modulating programmer electronically connected to, and physically adjacent to, the weapon station.

According to a fourth preferred embodiment of the invention, the programmable air-burst projectiles have an antenna that receives microwave band electro-magnetic transmissions emitted from a focused microwave programmer electronically connected to, and physically adjacent to, the weapon station. In this configuration, a radar interlacing microwave transmission is configured so that the radar measures the velocity of the programmable projectile, closing distance to a target and initiates detonation of the projectile, with optimum target effect.

The weapon station for carrying out the method according to the invention preferably comprises a weapon having a barrel with a muzzle and capable of firing ammunition projectiles from a common manufactured lot, preferably linked ammunition projectiles from an ammunition can; a mechanical support for the weapon configured for movement of the barrel in the elevation and azimuth directions; a sensing device disposed in or adjacent the weapon barrel for measuring the muzzle exit velocity (MV) of the fired projectiles; and a fire control unit, coupled to the MV sensing device and to the mechanical support, for controlling the movement of the weapon barrel.

The fire control unit includes a processor, responsive to a first input that receives a range of a desired target and a second input that receives an MV of an ammunition projectile, to calculate and produce an output to the mechanical support for setting the elevation of the weapon barrel prior to firing a projectile. The second input is configured to receive initially a default muzzle velocity for the ammunition projectiles, e.g., a linked chain of projectiles, from the ammunition can and, thereafter, post-shot of an initial firing such projectile(s), to receive an actual measured MV from said MV sensing device.

In a preferred embodiment of the invention, the fire control processor is operative to calculate a new setting for the weapon barrel elevation after the MV of an initial projectile volley is measured, thereby improving the aiming fidelity of the weapon.

Advantageously, the fire control processor is further operative to calculate a new setting of the weapon barrel elevation after the MV of each further projectile volley is measured, thereby to produce finer adjustments in the barrel elevation and thus continuously improve aiming precision for subsequent volleys.

Where a can of linked ammunition projectiles are programmable air-burst projectiles, the fire control processor is further operative to calculate a new setting of the weapon barrel elevation after the MV of each further projectile volley is measured, and to record a histogram of projectile MV's. The fire control processor uses the recorded histogram to continuously improve the elevation precision and the emitted projectile programming signal for the time of flight or burst of the projectile, to thereby improve the burst accuracy of second and subsequent projectile volleys.

In a preferred embodiment of the invention, the fire control processor adjusts the weapon barrel elevation for a terrestrial target to detonate the projectiles in the range of 1-3 meters above the desired target.

In a still further embodiment of the invention, a hand-held optical aiming device is used for determining the range to the desired target and for transmitting the range to the first input of said fire control unit.

For militaries, developing new technologies for combat defilade target engagement necessitates systems to locate, aim and program Air-Burst munitions (ABM) to function in a 3-dimensional battlespace. In many combat scenarios, targets are above or below grade and ABM ammunition detonates at a prescribed distance or time of flight. In other circumstances, it is desired to have an ABM optimized to defeat enemy UAS (unmanned aerial system), e.g., without limitation, a drone. Warfighters certainly desire kits allowing for effective updating of existing weapon platforms, so that systems work effectively in all combat environments, e.g., in urban areas, or in rugged terrain. To provide adequate context to the foregoing discussion and specification, some definition of terms is useful: GUN-TARGET RANGE is a Line-of-Sight (LOS) between the Gun and target. GUN-TARGET ANGLE ($\Theta$) and SLANT ANGLE ($\Theta$) are angles measured from the Earth's Horizontal Plane being tangent to the earth's horizon.

Kit: An embodiment of the invention provides a distributed system (e.g., a kit) with a capability to use two or more sub-components. In the kit, the sub-components fit with inclinometers, forming a tethered fire control that allows a grenadier to properly adjust the grenade launcher's GUN-TARGET ANGLE ($\Theta$), and fire a programmable ABM projectile with an optimum terminal effect, for a given GUN-TARGET RANGE and GUN-TARGET ANGLE ($\Theta$). Optimally, this proper adjustment should be the 1st step in engaging a target facilitating electronic measurement of the GUN-TARGET ANGLE ($\Theta$) by an inclinometer. A sighting device with a 1st inclinometer can be attached to a weapon or handheld by the grenadier, provided the sighting device is in close vicinity to the grenade launcher. It is useful to incorporate a $2^{nd}$ inclinometer to the kit, integrated with a programmer that has a fixed relationship with the grenade launcher, the $2^{nd}$ inclinometer measuring the SLANT ANGLE ($\Theta$) of the weapon. It is further useful to visually present an aiming solution to the grenadier, so the grenadier can raise or lower barrel elevation and fire the grenade launcher delivering ordnance with precision and an optimized terminal effect. Precise aiming of a programmable weapon is crucial especially where a target is positioned at an elevation above or below a grenadier. The distributed system allows for digital bore sighting to zero inclinometers.

Aiming Solution for ABM Programmable Ammunition: Preferably, the tethered kit includes two or three devices, allowing for measurement of the GUN-TARGET RANGE and GUN-TARGET ANGLE ($\Theta$) and providing a visual cue feature so that (1) the grenadier can elevate the weapon to a correct SLANT ANGLE ($\Theta$) and (2) the fire control will calculate an optimum time-to-detonate solution to telegram and transmit the optimum time-to-detonate solution to an ABM projectile considering the complex engagement geometry associated with a counter defilade system.

It is useful to configure the tethered kit so that the kit can utilize service qualified laser range finders, service qualified optics, and service qualified binoculars. It is further useful to operators to provide for quick attach/detach mounting points for components and utilize standardized interfaces such as a "Picatinny Rail" as set forth in MIL-STD-1913.

Due to the peculiar trajectory associated with grenades, it is useful that one kit module provides for a mount on a pivot, that allows for depression of a Sighting Unit and permit the grenadiers to manually rotate a set of components to obtain a correct SLANT ANGLE ($\Theta$). The components that may require alignment, in a depressed sight configuration include an open site, an optic sight, a fire control, a laser range finder or a laser pointing module.

Air Burst Munition Aim and Formatting a Time to Detonate Solution: Unlike standard munitions, where the gunner aims the weapon to "hit" a target, an ABM munition, engaging a target in defilade, a gunner cannot aim directly at a defilade target. In view of this challenge and with a goal of defeating a defilade target, a fire control for an ABM munition can utilize specialized computational techniques that utilize either (1) an adjustment coefficient for a range table or (2) a specialized adjustment algorithm, both techniques optimizing an ABM detonation at a HOB (height of burst) over a defilade target. In using either technique, the refined ABM aiming and programming computation techniques, used by a fire control unit, calculates an aim point above the defiled target and transmits a corresponding optimized time-to-detonate programming telegram to an ABM fuzed projectile, the time-to-detonate programming instruction corresponding to an optimum barrel elevation.

Discriminating Triggering for a Programming Signal: Some types of ABM ammunition can be optimally programmed after barrel exit. Some ABM munitions may be fired from an M320 in an "underslung" configuration where both a rifle and 40 mm grenade launcher are aligned, and a grenadier can operate both weapons. In this configuration, it is useful to use a discriminating trigger sensor as the transmission of programming telegrams coincident with small caliber firing from the rifle can cause a programmer to consume power or recoil of the weapon triggering programming emissions. To reduce power consumption, it is desirable to configure an ABM programmer to incorporate a discriminating directional shock and set-back trigger sensor. Using a discriminating trigger sensor affixed to the weapon, the system will sense a grenade's recoil, and format an ABM telegram that is, after a set delay, transmitted to an ABM projectile exiting the barrel. In these circumstances, the ABM projectile receives and decodes the telegram at a programming station forward of the barrel, after a set elapsed time interval passes. Usefully, a discriminating trigger sensor discriminates between higher recoil imparted on a programmer by grenades and the lower recoil imparted on a programmer when the rifle fires smaller caliber bullets. The discriminating trigger sensor is a directional recoil measurement device, typically housed in a programmer aligned to the grenade launcher's barrel, the trigger differentiating between the recoil imparted on the programmer by fired bullets and grenades. The discriminating trigger sensor initiates formatting and transmission of a telegram transmission from the programmer when grenades are fired but precludes unnecessary formatting and transmission of a programming telegram when small caliber bullets impart recoil on the programmer, thereby reducing power consumption of a programmer, fit to an underslung grenade launcher.

For a full understanding of the present invention, reference should now be made to the following detailed description of the preferred embodiments of the invention as illustrated in the accompanying drawings.

BRIEF DESCRIPTION OF THE DRAWINGS

FIG. 1A depicts a system diagram and function sequence for a prior Art Kongsberg Remote Weapon Station (RWS).

FIG. 1F depicts prior Art 40 mm terminal ballistics using the methodology described in the U.S. Pat. No. 9,600,900.

FIG. 1H shows modeling results for 40 mm×53 uncorrected volleys.

FIG. 2D shows a US M151 RWS with an MV measurement device.

FIG. 3A is a system block diagram for a US M151 RWS, improved with the addition of a muzzle velocity measurement and an air-burst programmer.

FIG. 4B depicts two views of an MK19 weapon from the gunner's perspective, showing a range output and an adjustment indicator.

FIG. 4C is a system function sequence diagram showing an initial and subsequent elevation solutions.

FIG. 4F depicts a manually-adjusted weapon, with a muzzle velocity sensor and a fire control device with range finder incorporated into external binoculars. The system is fitted with an Oerlikon AHEAD type of programmer to set the detonation time of a programmable projectile.

FIG. 5B depicts a sighting module according to an example embodiment of the disclosed concept.

FIG. 5C depicts a three-module tethered system according to an example embodiment of the disclosed concept.

FIG. 6A depicts a tethered kit according to an example embodiment of the disclosed concept.

FIG. 6B depicts a sighting module according to an example embodiment of the disclosed concept.

FIG. 6C depicts grenade operation according to an example embodiment of the disclosed concept.

FIG. 7A depicts a sighting module according to an example embodiment of the disclosed concept.

FIG. 7B depicts a sighting module according to an example embodiment of the disclosed concept.

FIG. 7C1 depicts a sighting module according to an example embodiment of the disclosed concept.

FIG. 7C2 depicts a tethered kit according to an example embodiment of the disclosed concept.

FIG. 7D depicts a tethered kit according to an example embodiment of the disclosed concept.

FIG. 8B depicts a sighting module according to an example embodiment of the disclosed concept.

FIG. 8C1 depicts a tethered kit according to an example embodiment of the disclosed concept.

FIG. 8C2 depicts a tethered kit according to an example embodiment of the disclosed concept.

FIG. 10A depicts a 40 mm grenade launcher according to an example embodiment of the disclosed concept.

FIG. 11C depicts sensor recoil measurement according to an example embodiment of the disclosed concept.

FIG. 12A depicts an armored vehicle with a muzzle velocity radar kit according to an example embodiment of the disclosed concept.

FIG. 12C depicts a projectile according to an example embodiment of the disclosed concept.

FIG. 12D depicts reflected microwave emission according to an example embodiment of the disclosed concept.

DETAILED DESCRIPTION OF THE PREFERRED EMBODIMENTS

Figure 1B:
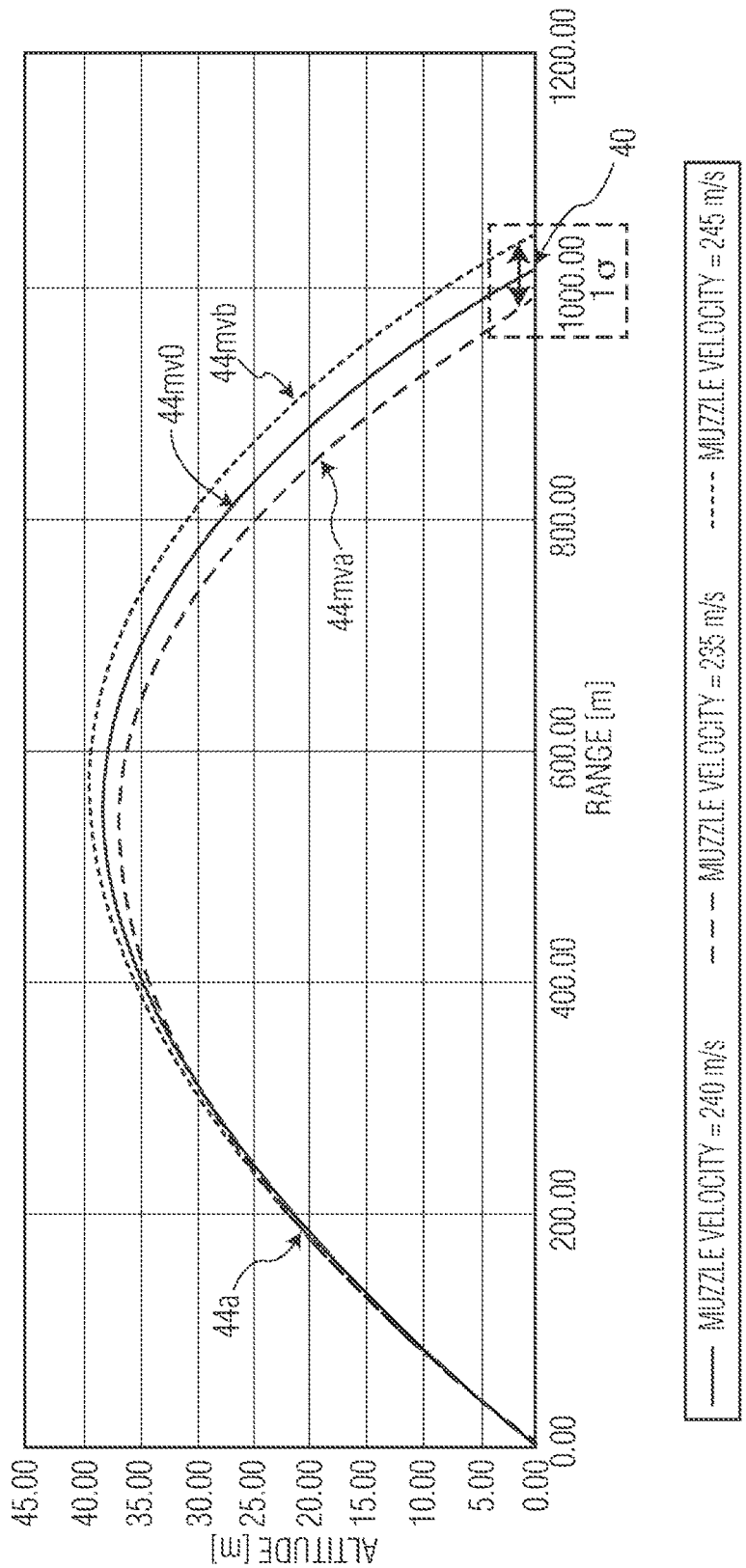
FIG. 1B depicts 40 mm terrestrial target ballistics at 1000 meters for the RWS shown in FIG. 1A.

The relevant prior art as well as the preferred embodiments of the present invention will now be described with reference to FIGS. 1A-4F of the drawings. Identical elements are designated with the same reference numerals.

Prior Art:

For context and for an understanding of the present state of the art, it is useful to examine the existing remote weapon station configurations to illuminate how lot-to-lot variation of mean muzzle velocity in 40 mm cartridges influences calculated aiming solutions. FIGS. 1A-1F depict benchmarks and performance characteristics delivered in existing systems.

FIG. 1A includes diagrams similar to those in the U.S. Pat. No. 8,286,872 for a remote weapon station optimized to fire air-burst ammunition. FIG. 1B depicts a 40 mm AGL ballistic flight path when aimed to impact near a ground target at 1000 meters.

Figure 1C:
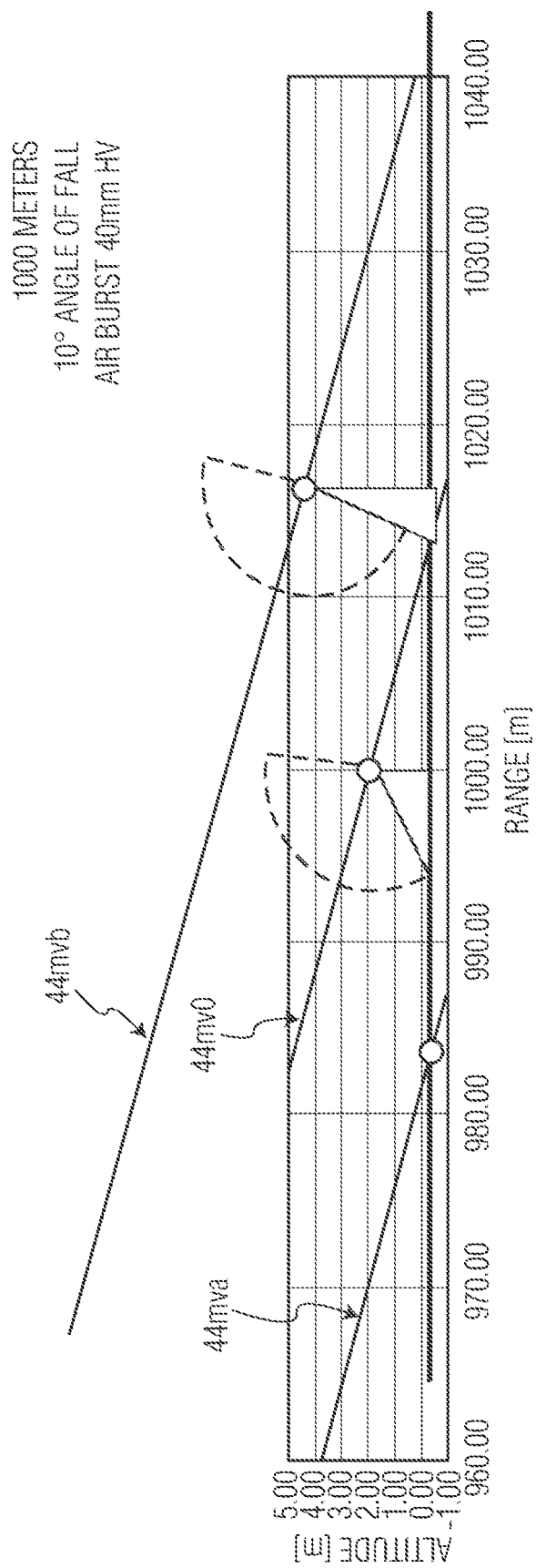
FIG. 1C depicts a detail of the 40 mm terrestrial target ballistics at 1000 meters shown in FIG. 1B.

Most fire control algorithms, presently in use, use encoded reference elevation tables and algorithms with an assumed standard muzzle velocity to calculate elevation. Unfortunately, the lot-to-lot variations of 40 mm×53 ammunition often result in the remote weapon station's missing their targets at extended ranges. FIG. 1B shows both the ballistic flight 44$mva$ of a cartridge fired with a 1 sigma muzzle velocity (lower muzzle velocity compared to the firing table algorithm) and the ballistic flight path 44$mvb$ of a cartridge fired with a 1 sigma muzzle velocity (above the firing tables average muzzle velocity). FIG. 1C is an enlarged view of the terminal ballistics resulting from the varying muzzle velocities 44$mv0$, 44$mva$ and 44$mvb$, depicting the detonation of a programmable 40 mm×53 air-burst ammunition projectile when fired along the ballistic flight path.

Figure 1D:
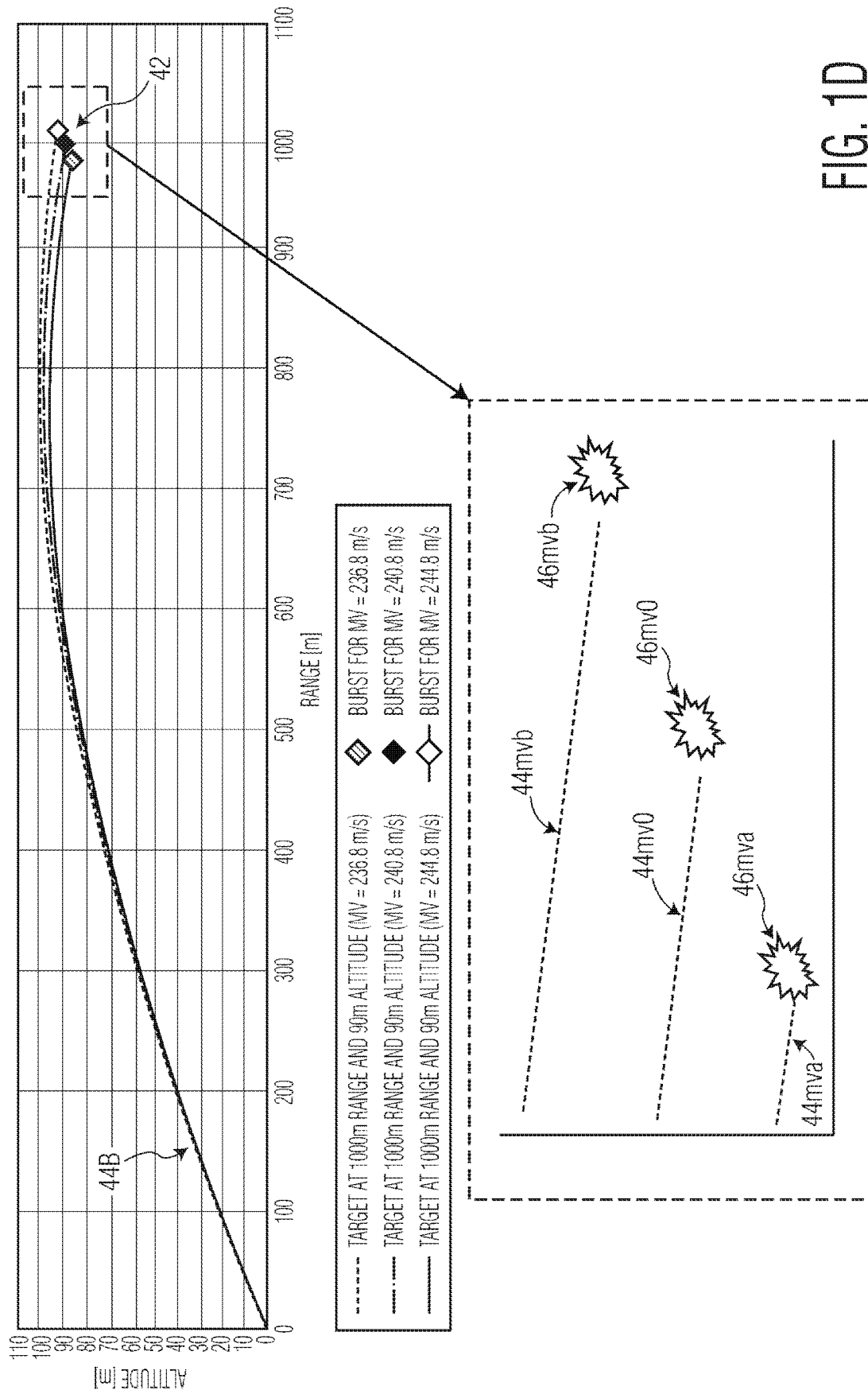
FIG. 1D depicts 40 mm drone (UAS) target ballistics at 1000 meters for the RWS shown in FIG. 1A.
Figure 1E:
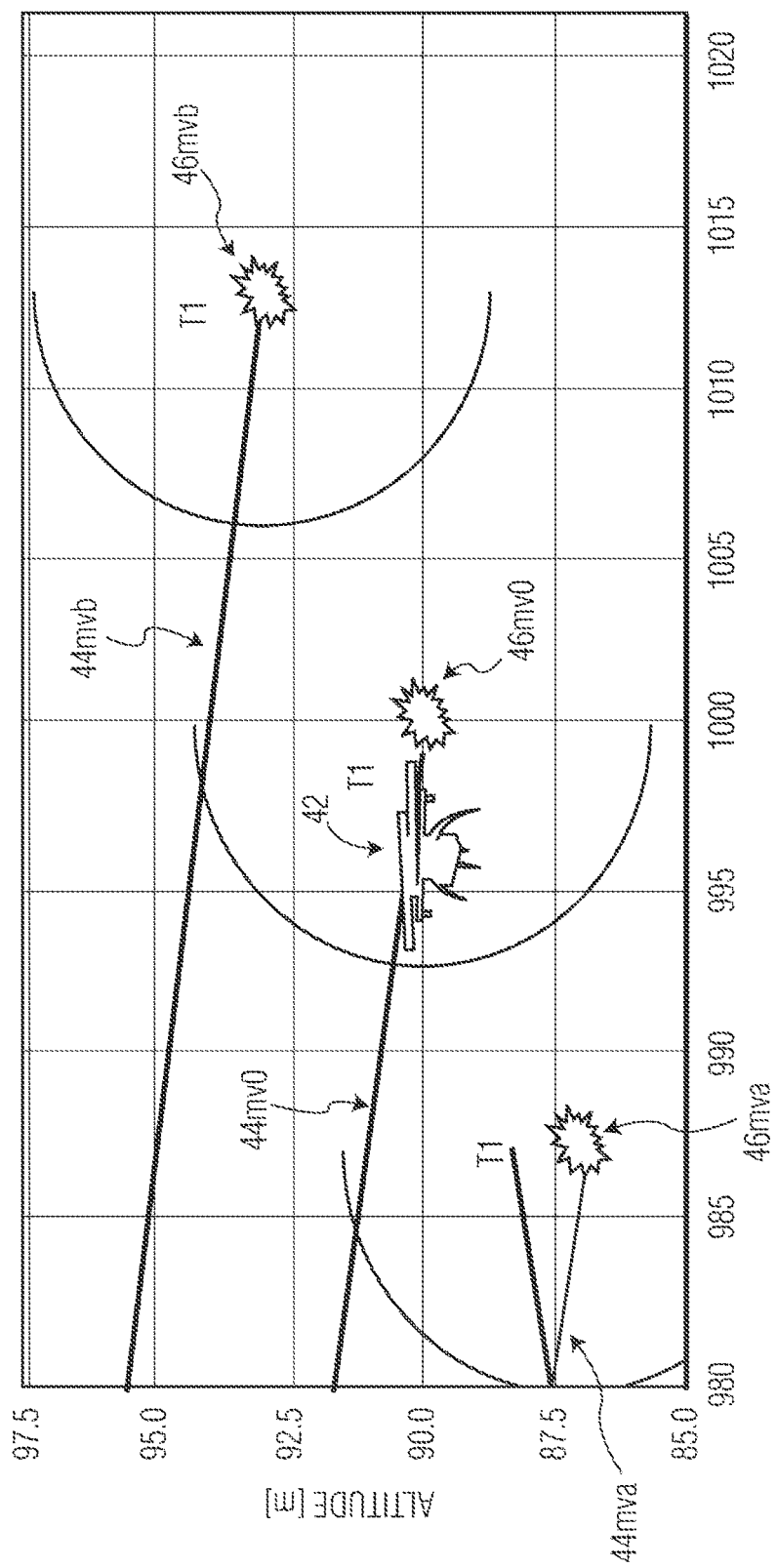
FIG. 1E depicts a detail of the 40 mm UAS target ballistics at 1000 meters shown in FIG. 1D.

FIG. 1D depicts the ballistic path 44 of a 40 mm AGL projectile firing at a target at an elevation of 90 meters and, for a set time, the detonation locations 46$mva$, 46$mv0$ and 46$mvb$ along the flight paths 44$mva$, 44$mv0$ and 44$mvb$, respectively, for ammunition without adjusted programmed time to detonation and without and second volley elevation adjustment. FIG. 1E illustrates the burst point variation transposed over a target UAV 42. FIG. 1F depicts the utility of adjusting the programmed flight time (to detonation) T2 in accordance with the method disclosed in the U.S. Pat. No. 9,600,900, and an automated elevation adjustment according to the present invention.

Figure 1G:
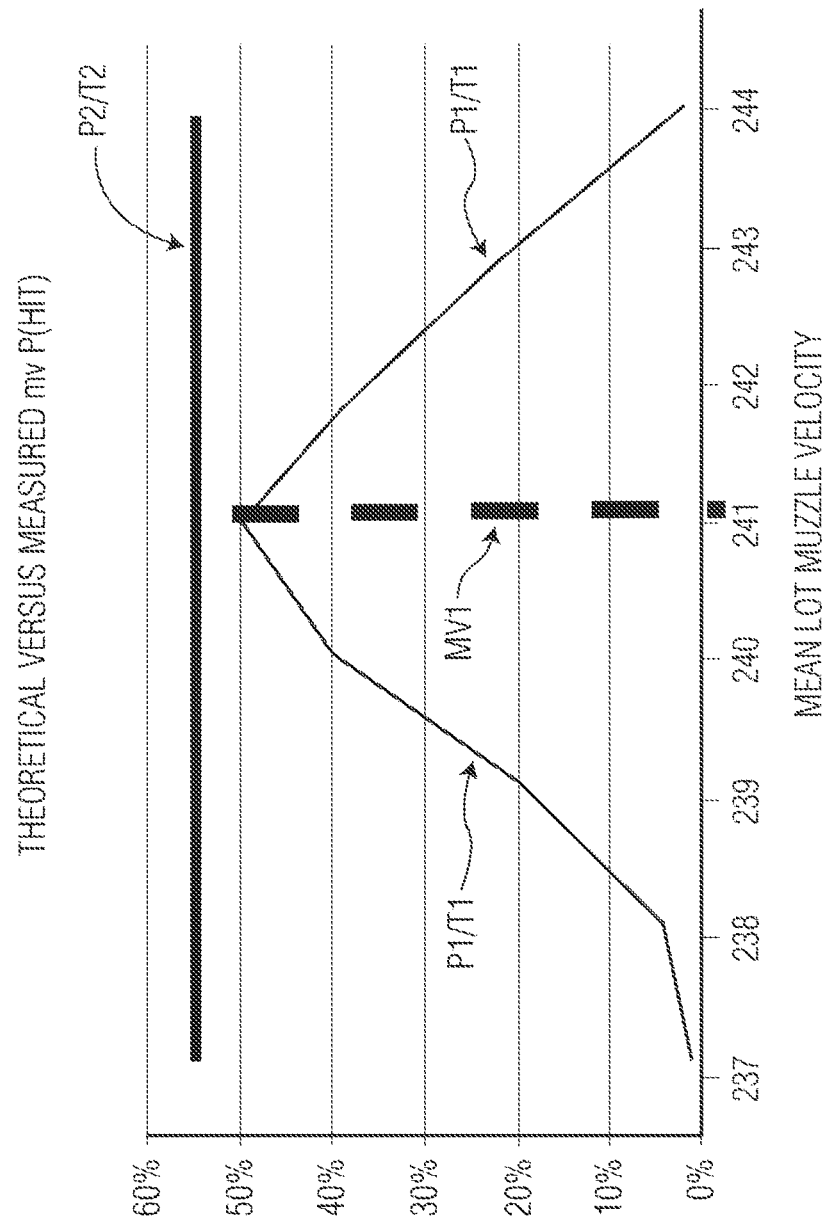
FIG. 1G is a graph of theoretical versus measured muzzle velocity and P(hit).

FIG. 1G is a simple graph, produced from modeling, identifying the mean miss distance of 40 mm high velocity ammunition for known projectile mean lot variation. FIG. 1H is a table showing the calculated probability of the average and adjusted miss distance for a first volley, as the muzzle velocity of a lot varies from the mean.

The purpose of the present invention is to improve a gunner's aiming for second and subsequent volleys. It may be incorporated into both remote weapon stations and manually-controlled weapon and fire control combinations.

Figure 2A:
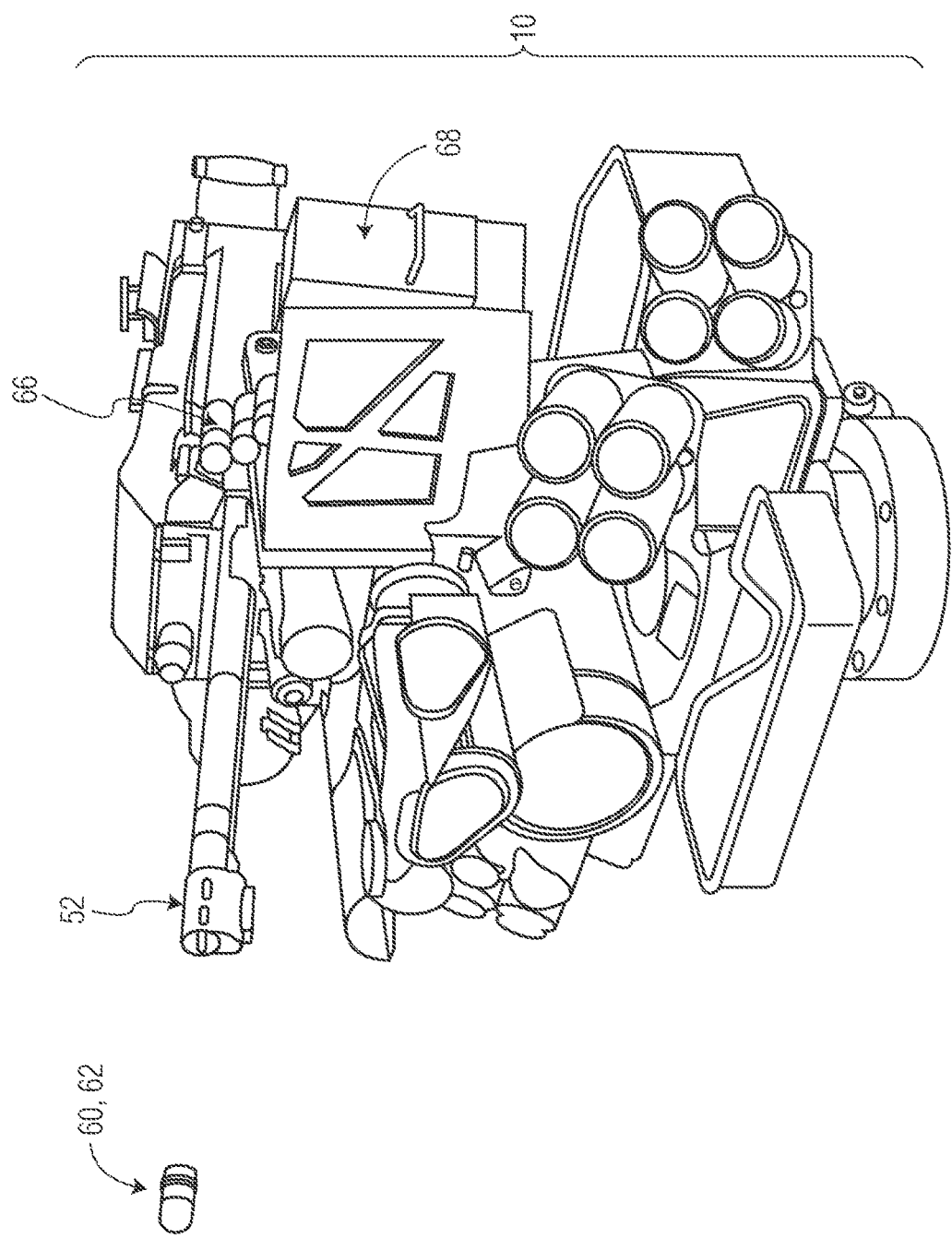
FIG. 2A shows a US M151 Remote Weapon Station ("RWS") with a muzzle velocity ("MV") measurement device on a MK19 firing an ammunition projectile.
Figure 2B:
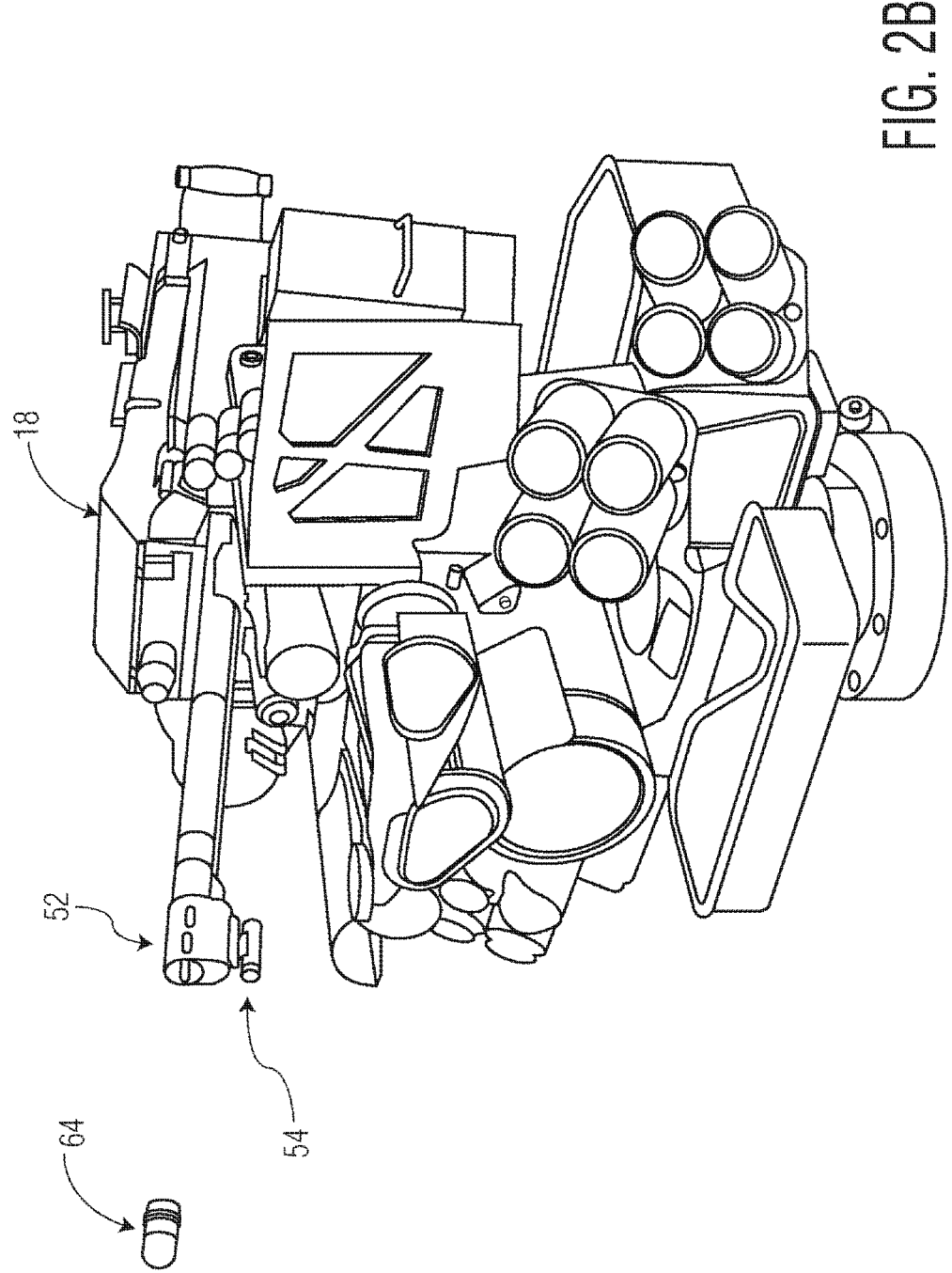
FIG. 2B shows a US M151 RWS with an MV measurement device on a MK19 firing an optically programmed projectile.

FIGS. 2A, 2B, 2C and 2D, with reference to corresponding FIGS. 3A, 3B, 3C and 3D, respectively, depict several embodiments 10 of the subject invention incorporated into a remote weapon station, with a muzzle velocity measurement device 52 that fires a projectile 60. The unfired projectiles are fitted in cartridges 66 that are stored in an ammunition can 68, in the rack of a Remote Weapon Station (FIG. 2A). These embodiments include a fire control computer 12, having a memory storage 12B and running a fire control algorithm 12D, mounted into a mechanical support 18 on a weapon. The muzzle velocity measurement device 52 feeds data to the memory storage 12B and the fire control algorithm 12D calculates the ballistic flight path. The system preferably incorporates a programmer 54 capable of programming ammunition projectiles 64 when they are fired from the weapon.

Figure 2C:
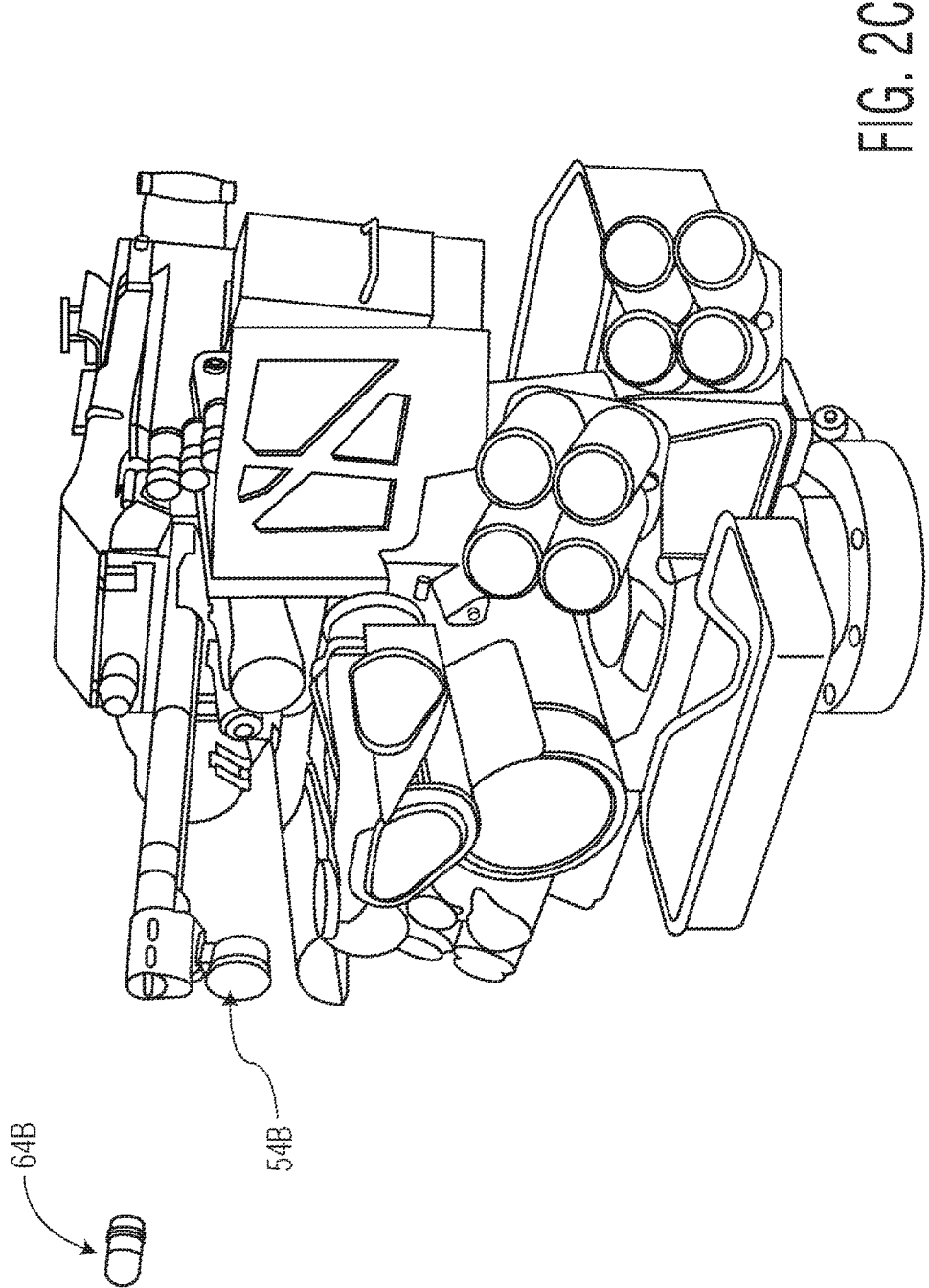
FIG. 2C shows a US M151 RWS with an MV measurement device on a MK19 firing an RF or extended range magnetically programmed projectile.

FIG. 2C depicts an RF programmer 54B on the muzzle of the weapon that programs an RF programmable projectile 64B. After a first volley V1, the system automatically re-aims, the mounted weapon producing an improved aiming elevation.

The embodiments of the invention shown in FIGS. 2A, 2B, 2C and 2D operate to fire a projectile 60, which may be conventional 62 or programmable 64. These embodiments include a muzzle velocity measurement device 52 that measures each projectile's muzzle velocity MV, stores this muzzle velocity in the memory 12B, and then employs the ballistic algorithm 12D to recalculate and reset the elevation 22B after firing. The second and subsequent volleys thus have an improved aim elevation, compared to the first volley.

FIG. 2D depicts an in-bore programmed projectile 64D, with an in-bore muzzle velocity measurement and programmer 54D as provided for in the Oerlikon (AHEAD) patents referred to above, which are licensed to STK (Singapore) and to General Dynamics Ordnance and Tactical Systems (US).

Figure 2E:
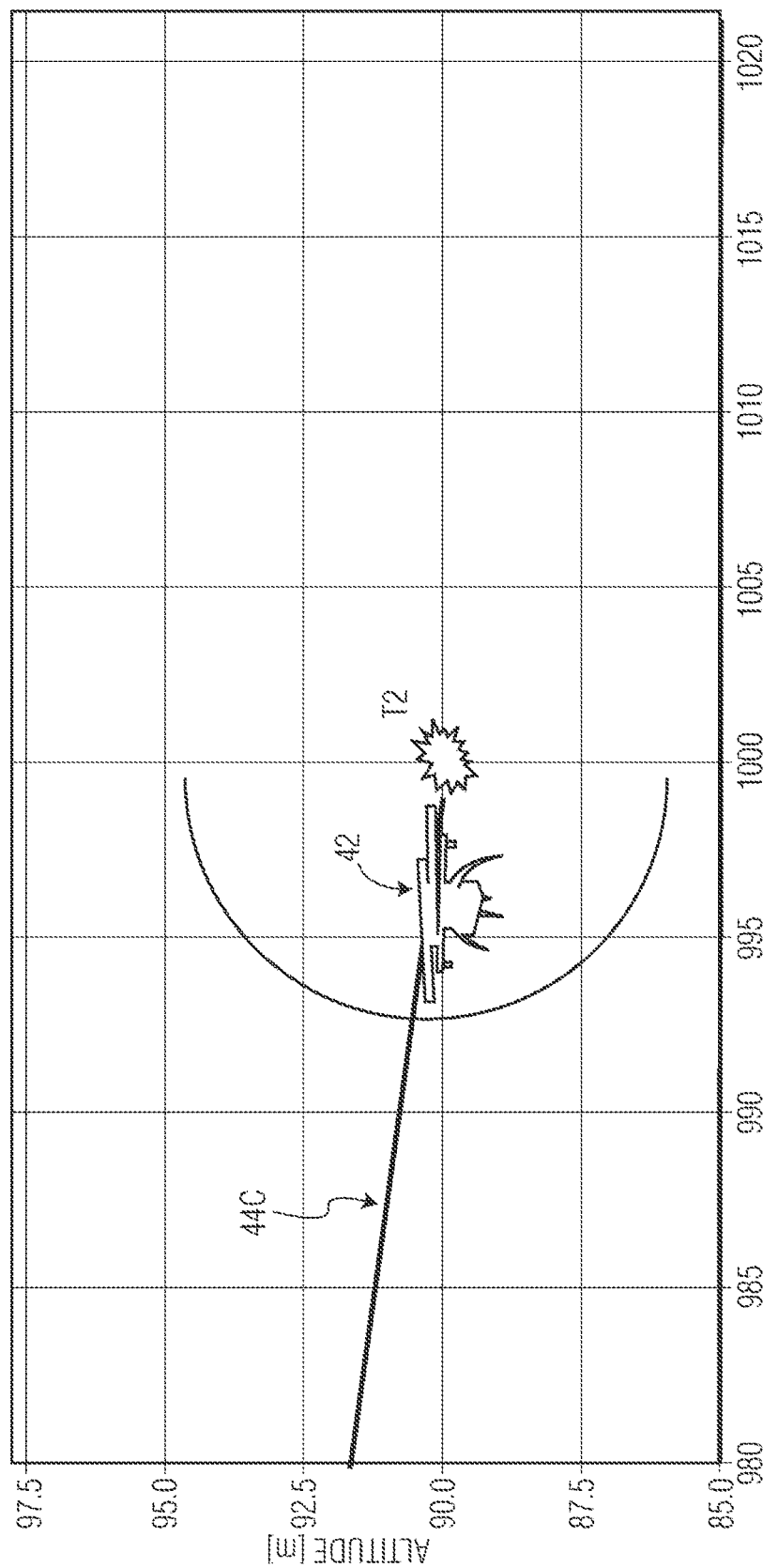
FIG. 2E depicts 40 mm UAS target ballistics at 1000 meters for the US M151 RWS with an MV measurement device shown in FIG. 2D.
Figure 2F:
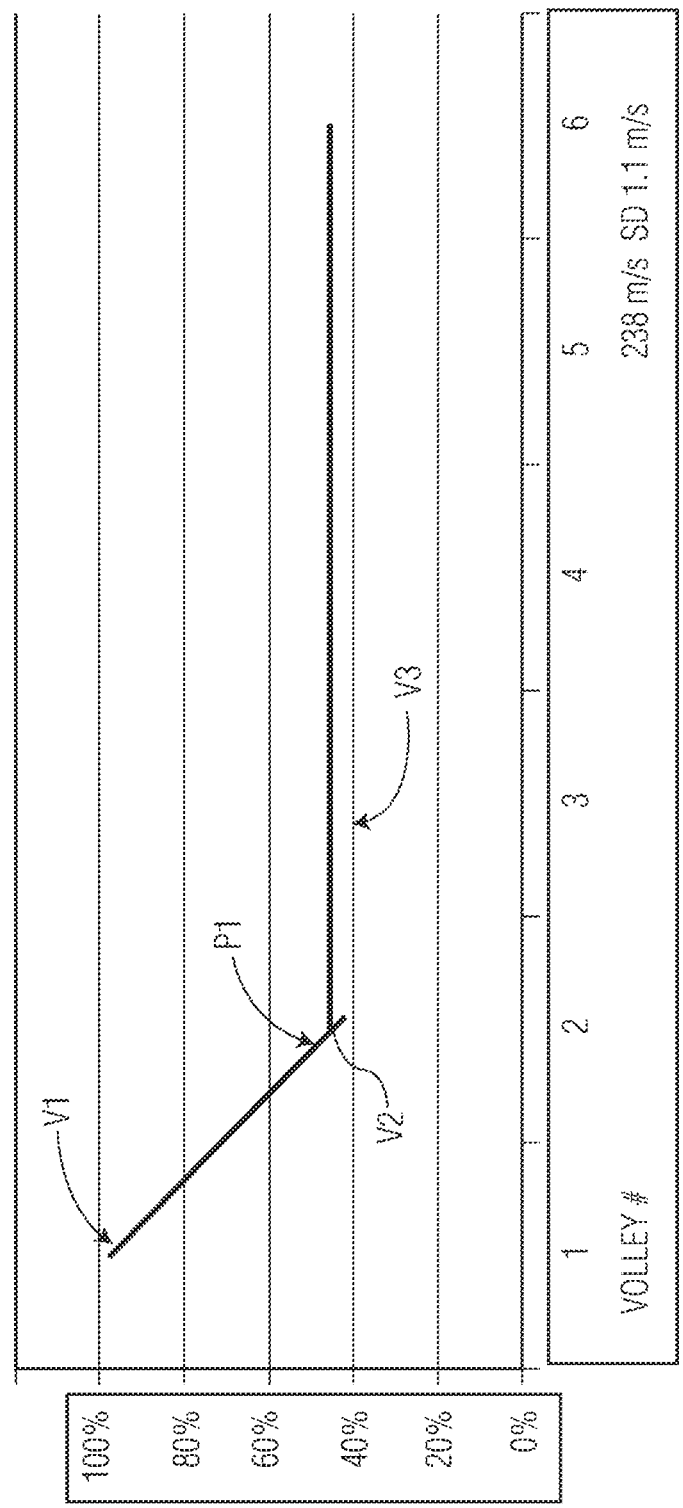
FIG. 2F depicts the average miss distance resulting from a 40 mm (lot) muzzle velocity variation from a ballistic solution's theoretical solution.

FIGS. 2E and 2F depict the expected improvement in firing with an unmanned system located at a range of 1000 meters and at an altitude of 90 meters. FIG. 2E depicts the projectile's improved ballistic path 44C, and the projectile's detonation at an adjusted time T2 in close proximity to the target 42. FIG. 2F depicts the forecasted improvement of a remote weapon station with the remote adjustment of the second volley, where the first volley V1 has a low probability of hit and the second volley V2 has an improved probability of hit P1. The initial aim point 12E for the initial firing test uses the assumed muzzle velocity for the lot of ammunition.

Figure 3B:
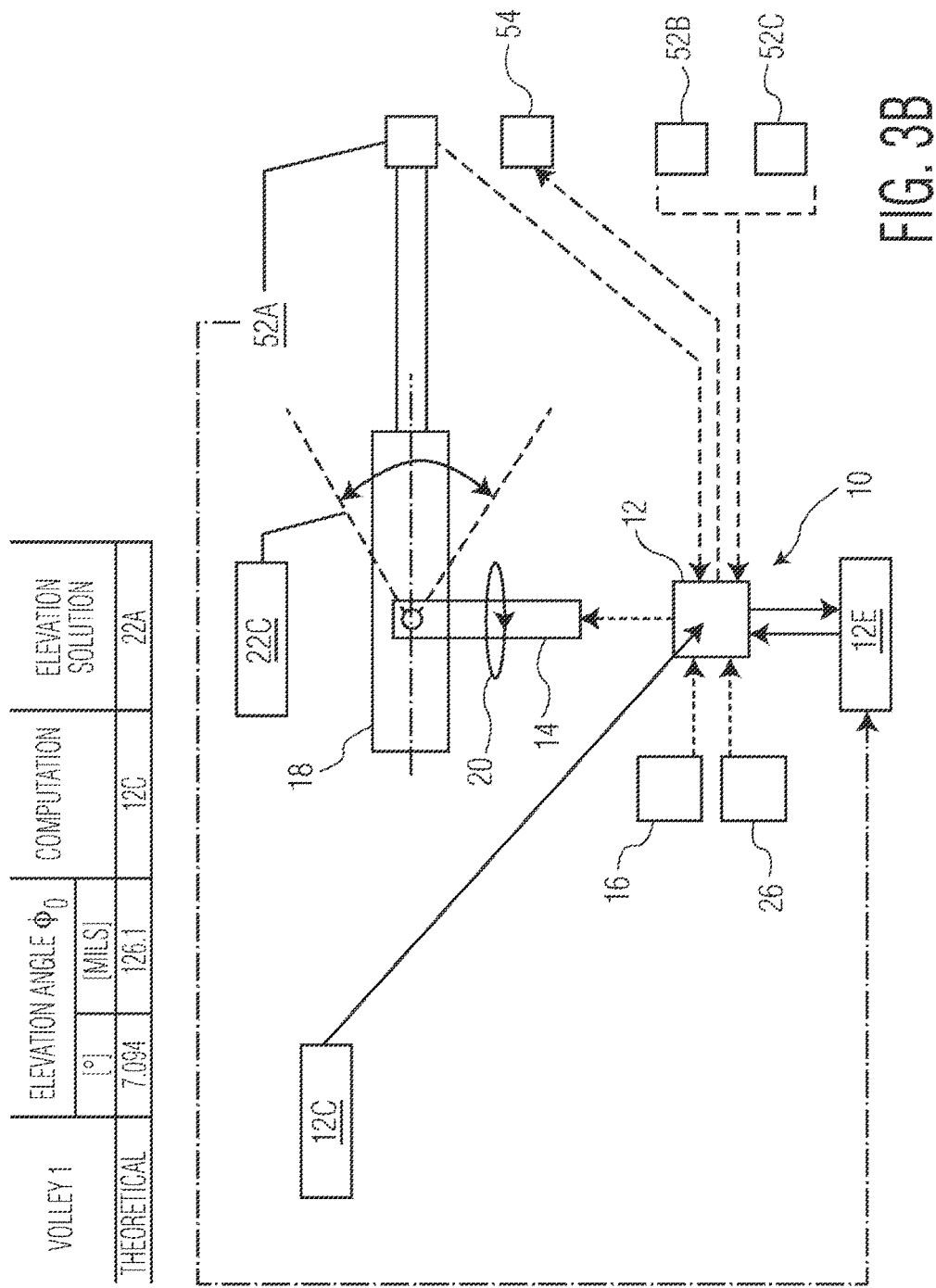
FIG. 3B is a system block diagram for a US M151 RWS, firing a second volley with an improved system function to measure muzzle velocity, adjusting elevation and firing a programmable air-burst projectile. The table in the top left corner of the figure depicts a method of computation used in the fire control ballistic computer and a resulting elevation solution.
Figure 3C:
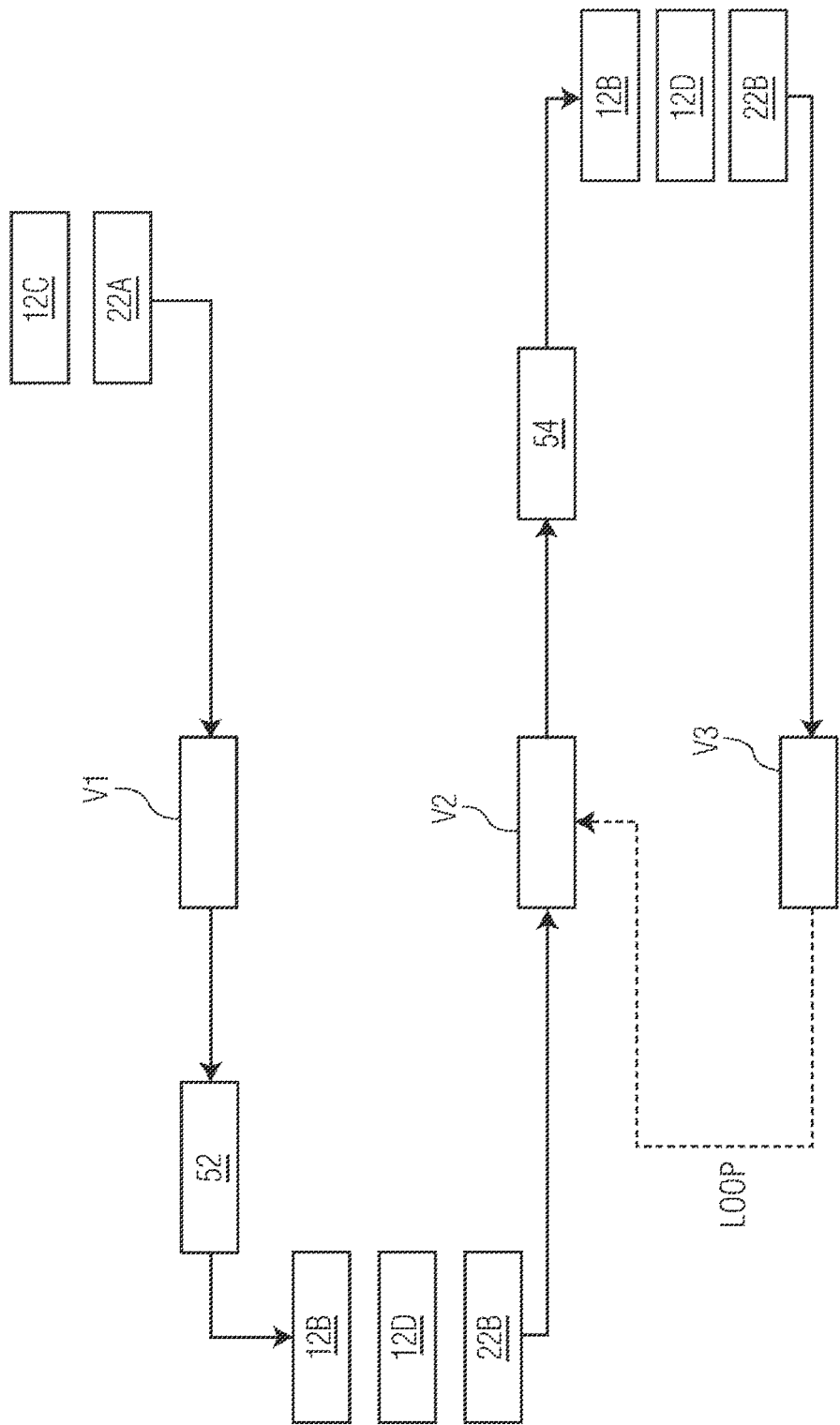
FIG. 3C is a system function sequence diagram for an exemplary initial commutation, based on an algorithm or table, identifying an elevation solution for a second volley with a re-adjusted elevation, where the weapon system previously measured the first volley muzzle velocity.

FIG. 3A depicts a remote weapon station system with a muzzle velocity measurement device 52A, 52B, 52C and programmer 54. With reference to FIG. 3B, the remote weapon station firing a first engagement volley aims the weapon using a theoretical or default muzzle velocity 12C and may adjust the users aiming point 12F. As represented in FIG. 3C, a second volley is aimed using a ballistic solution algorithm 12D that runs, based on the measured muzzle velocity. FIG. 3C depicts the sequence of fire control sub-routines of a first, second and subsequent volley.

FIG. 3A is an external view of improved remote weapon configuration according to the invention, with a muzzle velocity measurement device 52 mounted on a weapon's muzzle. FIG. 3B shows a system diagram for US M151 RWS Remote Weapon Station that includes a conventional muzzle velocity measurement device 52A, or a radar device 52B that may include a position sensor 52C, such as that disclosed in U.S. Pat. No. 8,074,555. This RWS system operates with a projectile programmer 54.

The initial commutation in the system of FIG. 3B is based on an algorithm or table 12C, identifying an elevation solution 22C. The table (left top) identifies the theoretical elevation for a 40 mm AGL cartridge where the solution is derived from a firing table.

FIG. 3C is a process flow diagram illustrating the remote weapon station's control sequencing when firing volleys V, with control sub-routines identified. The exit velocity of the first volley V1 is measured at 52 and a fire control computer 12B then calculates a fire control solution 12C based on an algorithm that uses a default muzzle velocity. When firing a second volley V2, an alternative fire control algorithm 12D re-adjusts the elevation 22B.

Figure 3D:
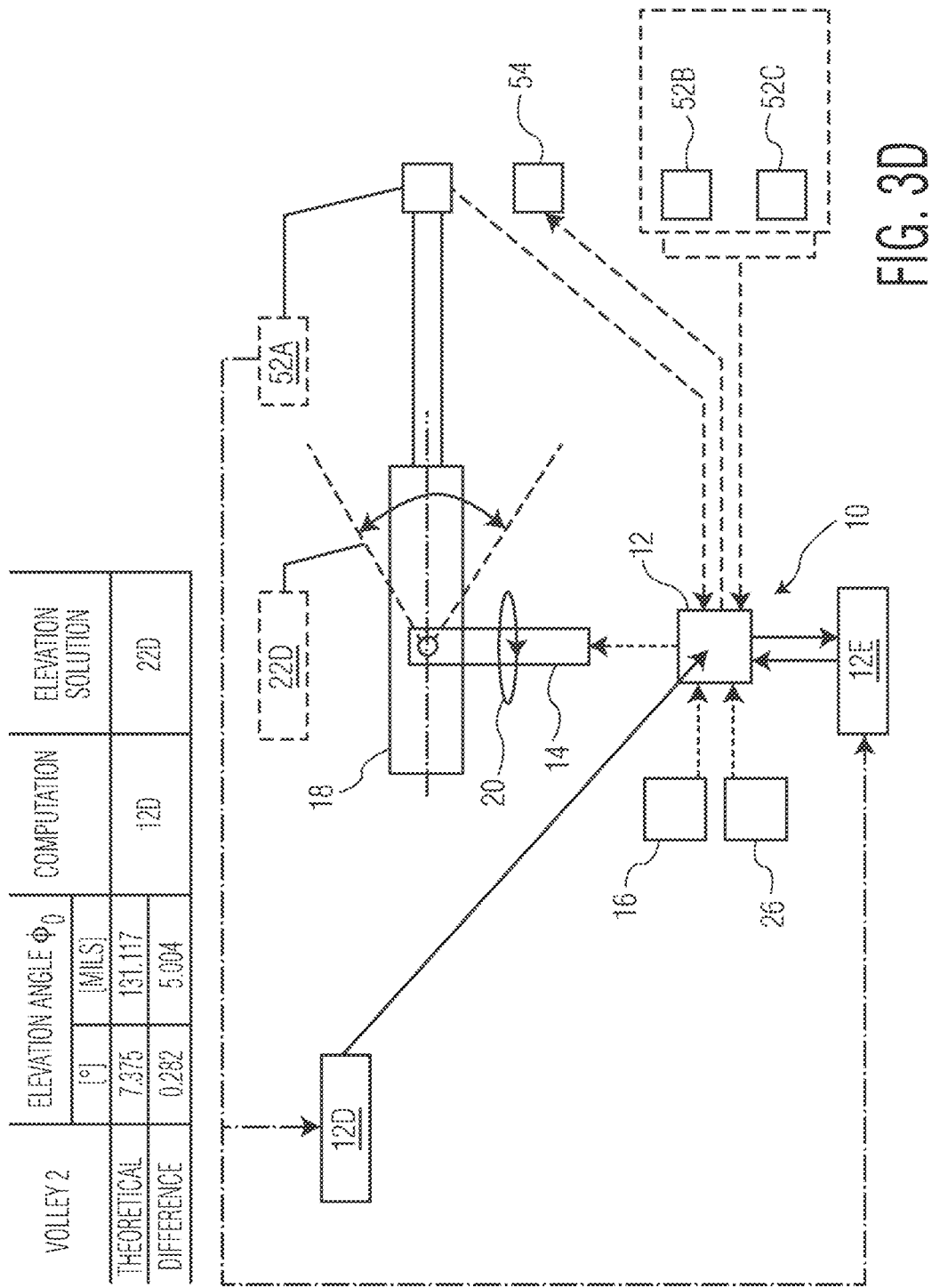
FIG. 3D is a system function sequence diagram for a second volley elevation solver using a histogram of prior shots data, producing a revised solution for a second and subsequent volleys. The diagram depicts sequencing of volleys and fire control sub-routines where a first volley calculates a solution based on a default muzzle velocity and second and subsequent volleys use actual measured muzzle velocity.

FIG. 3D shows a system in which the muzzle velocity of an initial volley is measured at 52A and a fire control computer 12, using measured velocity V1, re-adjusts the weapon and mechanical support 18 to a second elevation solution. This system relies on a histogram of prior shot muzzle velocity data stored in the fire control memory.

Figure 4A:
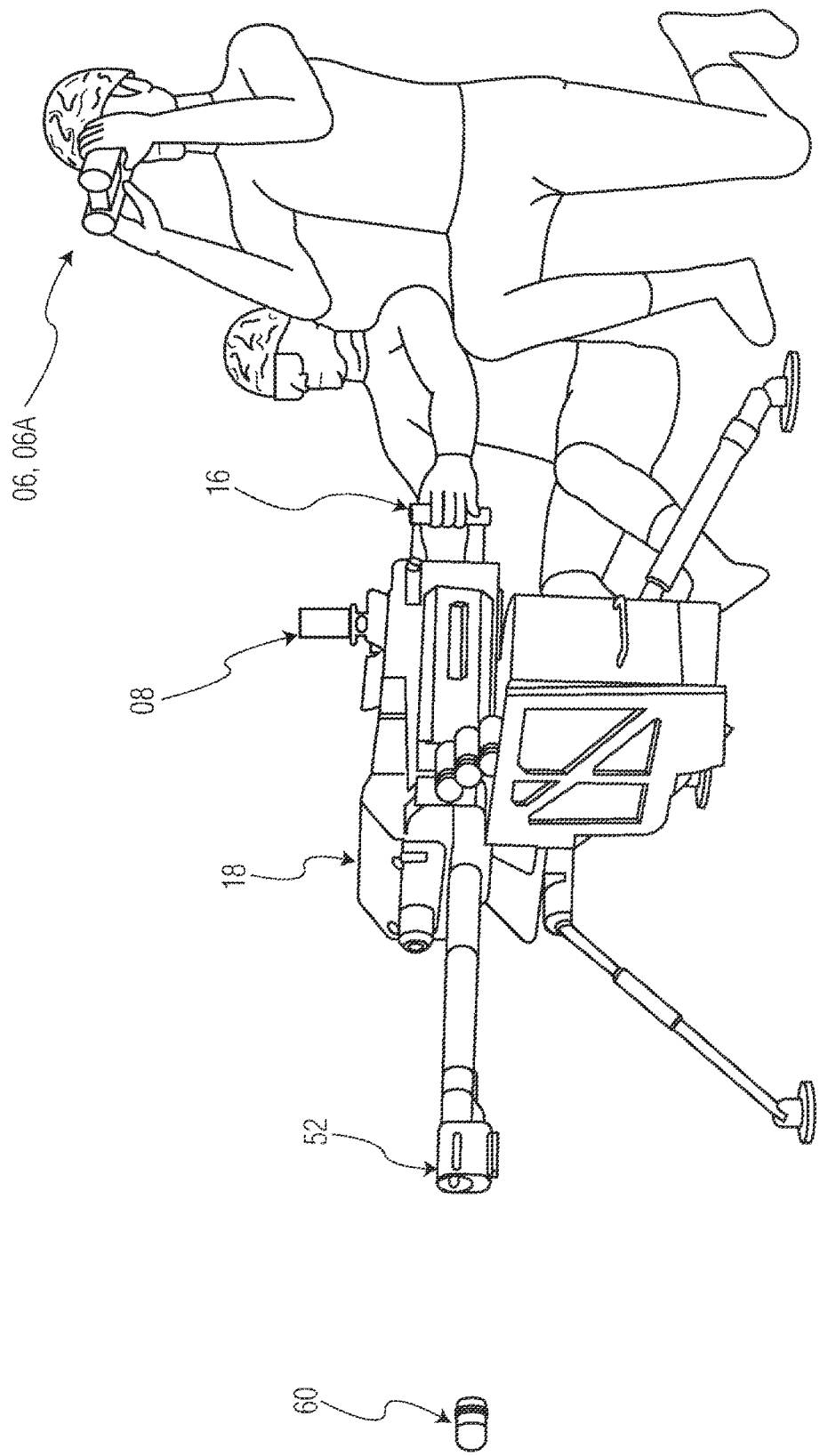
FIG. 4A depicts a manually-adjusted weapon, with a muzzle velocity sensor, a fire control and range finder incorporated into external binoculars.
Figure 4D:
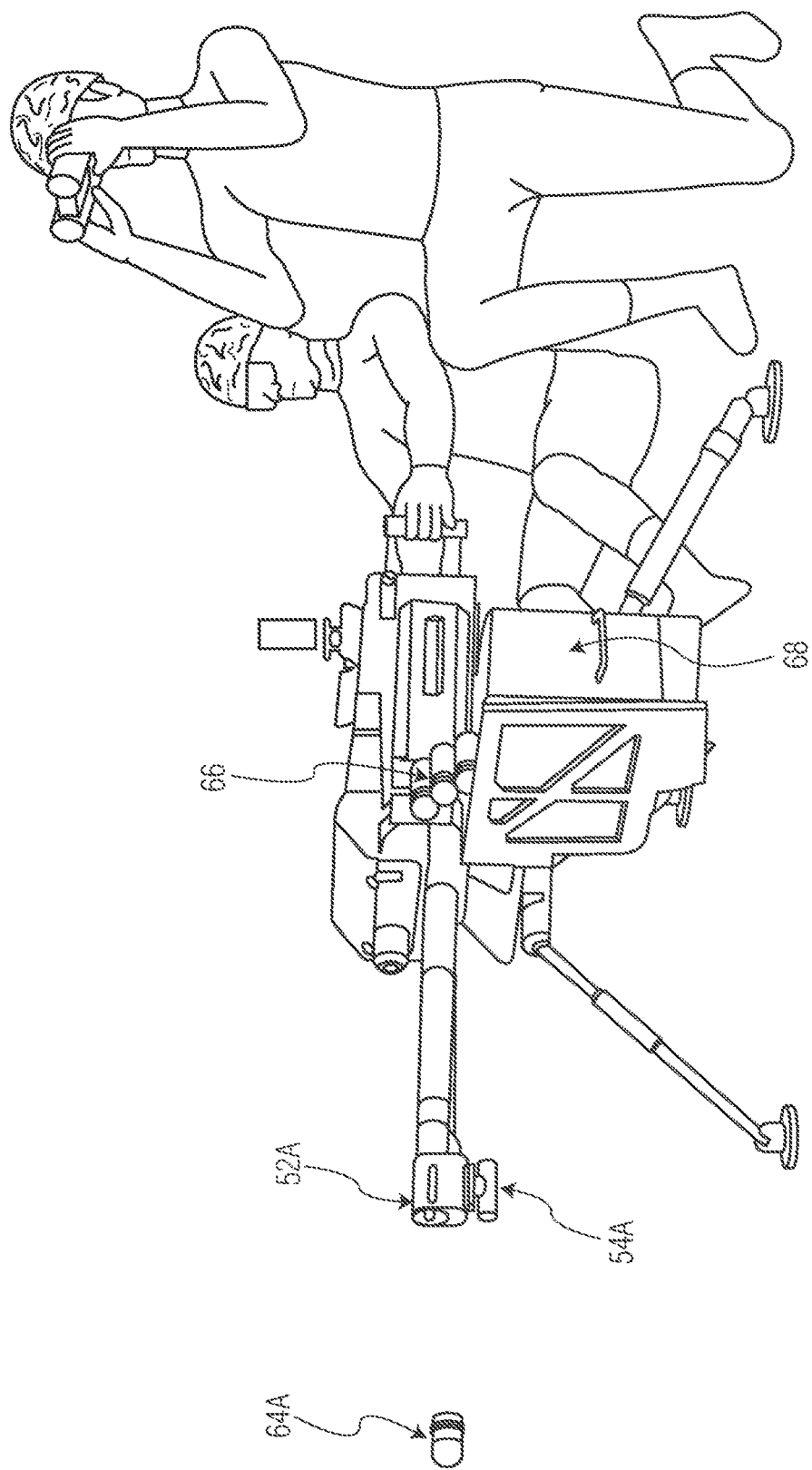
FIG. 4D depicts a manually-adjusted weapon, with a muzzle velocity sensor and a fire control device with a range finder incorporated into external binoculars. The weapon system is fitted with an optical programmer to set the detonation time of a programmable projectile.
Figure 4E:
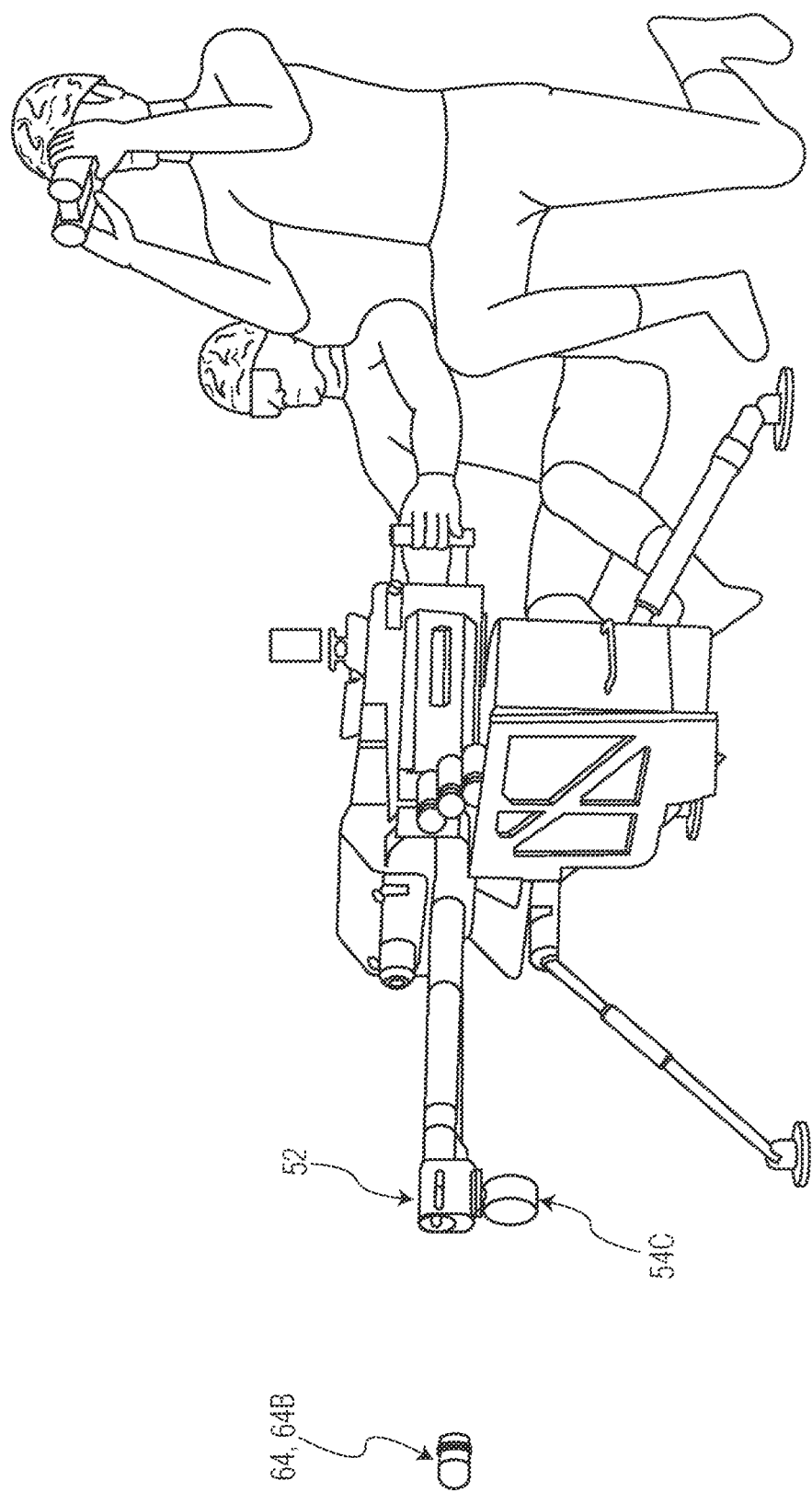
FIG. 4E depicts a manually-adjusted weapon, with a muzzle velocity sensor and a fire control device with range finder incorporated into external binoculars. The system is fitted with an RF or Extended Range Magnetic Induction programmer to set the detonation time of a programmable projectile.

FIGS. 4A, 4B, 4C, 4D and 4E depict an alternative embodiment of the invention having a manually-elevated mounted weapon 18, with a display 08, connected to a fire control system 12D with a projectile velocity measurement sensor 52, where the system includes external range-finding binoculars with a data link 06A (either galvanic or wireless). This system may fire conventional cartridges 60 as depicted in FIG. 4A or programmable cartridges 64A, 64B and 64D as depicted in FIGS. 4D, 4E and 4F. FIG. 4F, similar to FIG. 2D, depicts the sequencing of firing the manually-elevated weapon with an in-bore muzzle velocity measurement and programmer 54D.

Range-finding binoculars with a data link output (for example, Bluetooth wireless or an RS232 cable connection) that are suitable for use with this system are available commercially. Examples are:

1. Zeiss Victory 10×45 T RF range-finding binoculars (with laser ballistic information system—BIS);
2. Nikon Laser force 10×42 mm range-finding binoculars (with a 905 nm laser range finder);
3. Leica Geovid 10×46/10×56 range-finder binoculars;
4. Steiner 8×30 military LRF binoculars (with laser range-finder and RS232 cable output for a galvanic interface connection); and
5. Newcon Optik LRB 4000 CI laser range-finder binoculars with an RS232 cable output interface.

The binoculars are used manually to determine range to the target and transmit the range to the fire control system 12D.

Figure 5A:
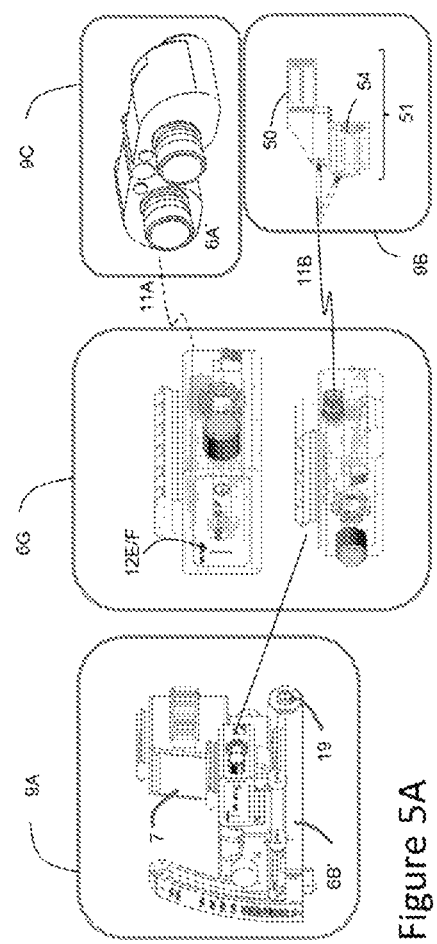
FIG. 5A depicts a three-module tethered system according to an example embodiment of the disclosed concept.

FIG. 5A depicts a distributed aiming and ammunition programming system according to an example embodiment of the disclosed concept. The system is a three-module tethered system including a sighting module or device 9A, a transmitter module or device 9B, and a targeting module or device 9C. The sighting module 9A includes a Sighting Mount 6B' with a Pivot 19, the Sighting Mount 6B' providing mounting points to affix multiple components including (1) a Sighting Unit 6G having an Elevation Indicator 12F' and (2) an Aim Optic 7. The transmitter module 9B is a multi-function module integrating a Muzzle Velocity Measurement Device 50 and a Programmer 54, which form a Muzzle Velocity Measurement and Programming System 51. The transmitter device 9B encodes an electronic, optical or magnetic modulation and transmits the modulation focusing the transmission for receipt at a programming station. The sighting module 9A has a core component—a Sighting Unit 6G that has a Galvanic Data Link 11B to the transmitter module 9B and is wirelessly connected 11A to the targeting module 9C. These modules 9A, 9B, 9C are tethered to one another such that they have continuous physical or wireless electronic connections.

FIG. 5B depicts a sighting module 9A composed of a Sighting Mount 6B' with a pivot with 19 and attachment points 6C' to affix and align the components of the sighting module 9A. In this configuration, an Aiming Optic 7 is affixed to the Sighting Mount's attachment point 6C' and a Sighting Unit 6G is affixed to the Aiming Optic 7. The sighting unit 6G includes preliminary elevation indicator 12E, adjusted elevation indicator 12F, and an inclinometer in fire control and sighting device 182.

FIG. 5C depicts a distributed aiming and ammunition programming system according to an example embodiment of the disclosed concept. The illustrated system is a three-module tethered system mounted on a weapon 150, e.g., without limitation, an MK19 grenade launcher, and includes a Sighting module 9A, a transmitter module 9B, and a handheld Targeting module 9C. The sighting module 9A includes a core component—Sighting Unit 6G that measures the GUN-TARGET ANGLE (Θ) 185B, a Pivot 19, and a Sighting Mount 6B' allowing for the mounting of sub-systems attachments. The Transmitter module 9B includes a Muzzle Velocity Measurement and Programming System 51, integrating a Muzzle Velocity Measurement Device 50 and Programmer 54. The Transmitter module 9B also includes inclinometers to measure the SLANT ANGLE (Θ) 186B of the barrel and program a programmable projectile 64' forward of the muzzle of the grenade launcher 150. The handheld Targeting module 9C measures the GUN-TAR- GET RANGE 185A and may also identify a preliminary GUN-TARGET ANGLE (Θ) 185B.

Figure 5D:
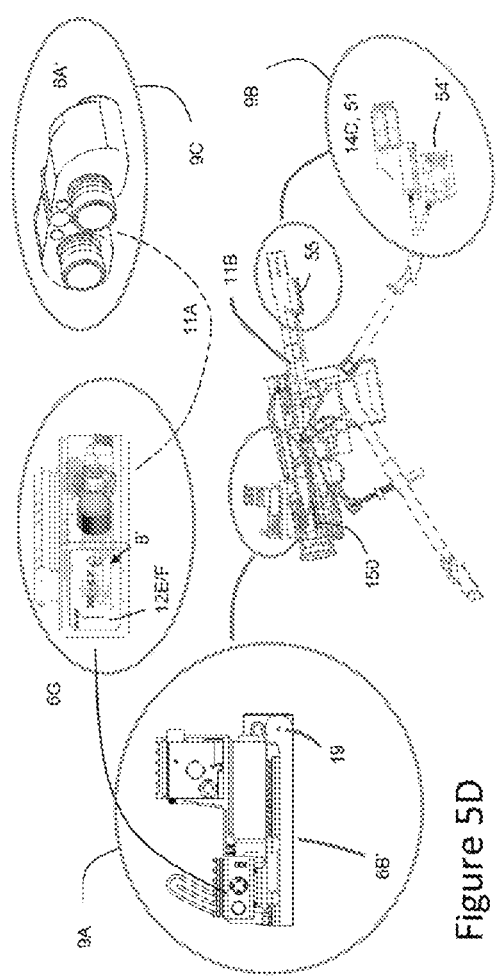
FIG. 5D depicts an integrated kit according to an example embodiment of the disclosed concept.

FIG. 5D depicts an integrated kit including three modules (a sighting module 9A, a transmitter module 9B, and targeting module 9C) mounted to an MK19 grenade launcher 150. The Sighting module 9A with Picatinny Rails attachment points 6C' allowing for alignment of components, where the sighting mount 6B' has a pivot 19 that allows for alignment and mounting of a Sighting Unit 6G, that has a display 8' with an Elevation Indicator 12F'. In this depiction, the transmitter module 9B retains a fixed geometry to the grenade launcher 150 and has attachment points 55 to attach a Programmer 54 that is incorporated into a muzzle break on the barrel 14C. The programmer 54 and a muzzle velocity measurement device 50 form a muzzle velocity measurement and programming system 51. The Sighting Unit 6G connects to the transmitter module 9B (e.g., the transmitter's sub-systems) via a Galvanic Data Link 11B. The targeting module 9C remains handheld, typically used by the assistant gunner 58'.

FIG. 6A depicts a Tethered Kit, formed of two modules—a sighting module 9A and a transmitter module 9B. The sighting module 9A includes a Sighting Mount 6B' having a Pivot 19, allowing the operator to depress an Aim Optic 7, Laser Range Finder 6H' and a Sighting Unit 6G including a Dismounted Aim Data Display 8' with Elevation Indicator 12F'. The transmitter module 9B incorporates in an inclinometer 184 with a muzzle velocity measurement device 50 and an extended range magnetic induction programmer 54B. The sighting module 9A and the transmitter module 9B incorporate a ballistic calculator 12A in a fire control unit 12, and these modules are tethered to each other physically or wirelessly for, e.g., without limitation, communications. These tethered modules 9A,9B receive sensor input from, e.g., projectile measurement sensor 52, oriented trigger sensor 152, discriminating recoil sensor 172, etc. They solve for an optimum aim elevation and height of burst for the gun-target engagement, perform system formatting (e.g., without limitation, formatting a programming telegram, formatting time-to-detonate instructions, visual cues or indicators, ballistic calculator, waveform or any other formatting for the system or kit to accurately operate, etc.), and transmit an optimum time to detonate digital telegram to a programmable projectile being programmed forward of the weapon's muzzle. And a fire control unit 12 of the system is structured to correct the aim elevation for shooting at a target above or below the horizon. These two modules 9A,9B are connected via a Galvanic Data Link 11B connecting the Sighting device's sighting unit 6G to the transmitter module 9B with a Muzzle Velocity Measurement and Programming System 51. The fire control unit 12 for an air burst munition programmer utilizes an algorithm adjusting a time to detonate programming transmission, adjusting the programming time with a measured exit velocity. The fire control unit uses a modular ranging device affixed to a pivoting mount via a Picatinny rail. The sighting device 9A is affixed to the weapon.

FIG. 6B depicts additional detail on the Sighting module 9A depicted in FIG. 6A with a Sighting Mount 6B' with a pivot with 19, the components having multiple attachment points 6C' to affix and align sighting module 9A components 6G, 6H' and an aiming optic 7. In the depicted configuration, an Aiming Optic 7 is affixed to the Sighting Mount's attachment point 6C' and both a Sighting Unit 6G and Laser Range Finder 6H' are affixed to the Aiming Optic 7. The sighting unit 6G includes preliminary elevation indicator 12E, adjusted elevation indicator 12F, and an inclinometer in fire control and sighting device 182.

FIG. 6C depicts a grenadier 56' operating a grenade launcher 150 with a two module kit including a sighting module 9A and a transmitter module 9B. The Sighting module 9A includes a Sighting Unit 6G on a Sighting Mount 6B' having a Pivot 19 and the Sighting Unit 6G has a Display 8' with an Elevation Indicator 12F and inclinometer (not depicted) that allows for measurement of a GUN-TARGET ANGLE (Θ) 185B. The transmitter module 9B has a Muzzle Velocity Measurement Device Programming System 51 with an inclinometer 184 allowing for measurement of a SLANT ANGLE (Θ) 186B. The transmitter module 9B emits a programming telegram 53 after a programmable projectile 64' exits the barrel.

Figure 6D:
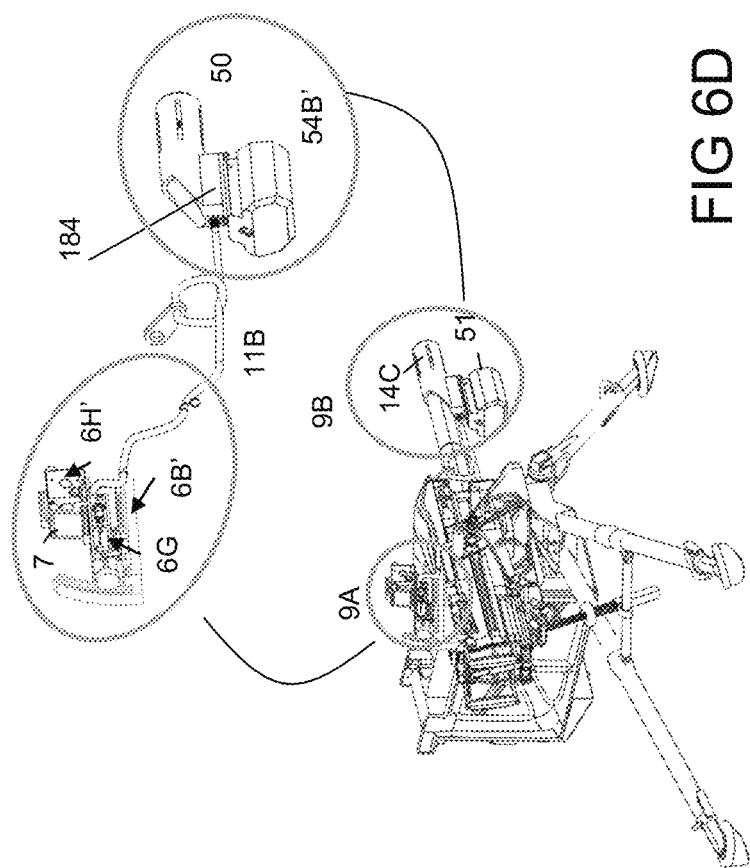
FIG. 6D depicts a tethered kit according to an example embodiment of the disclosed concept.

FIG. 6D depicts a two-component tethered kit attached to an MK19 Grenade Launcher 150. The kit includes a sighting module 9A and a transmitter module 9B. The sighting module 9A includes a Sight Mount 6B' affixed and aligned by Attachment Points 6C' for mounting an aim optic 7 and Sighting Unit 6G with an affixed Laser Range Finder 6H' on top of a weapon, e.g., the MK 19 grenade launcher 150. The transmitter module 9B is incorporated into a Muzzle Velocity Measurement and Programming System 51. The two components 9A, 9B are tethered, e.g., galvanically connected 11B, and are mounted to a crew served weapon.

FIG. 7A depicts a three-component kit including a sighting module 9A, a transmitter module 9B, and a hand-held targeting module 9C. The sighting module 9A includes a Sight Mount 6B', a Sighting Unit 6G, and a Dismounted Aim Data Display 8' on a pivot 19. The transmitter module 9B includes a programmer 54 with a fixed relationship to the weapon barrel measuring Barrel Elevation 184'. The kit further includes a hand-held targeting module 9C, e.g., without limitation a binocular. The sighting device 9A and the transmitter device 9B allows for alignment zeroing of kit components with digitally tethered inclinometers. That is, these devices 9A,9B are digitally tethered to each other via galvanic cables. The devices 9A,9B are also capable of being aligned with the inclinometer that is digitally tethered to the devices 9A,9B. In some cases, the sighting device 9A and the transmitter device 9B are digitally or electronically tethered to each other via a secure near field connection. In some cases, the inclinometer is calibrated upon being mounted to the weapon.

FIG. 7B depicts additional detail of the sighting module 9A of a three-module kit. The sighting module 9A includes a sighting mount 6B' with a pivot 19, attachment points 6C', a sighting unit 6G and aim optic 7. The kit is affixed to the Sighting Mount 6B' with the pivot 19 and attachment points 6C' incorporated into a Sighting Unit 6G.

FIG. 7C1 depicts the three-module tethered kit, mounted on an M4 rifle 140 with an M320 Grenade Launcher 150 in an underslung position. The kit includes at least a sighting module 9A, having an attached Sighting Unit 6G that has an inclinometer (not depicted) that measures the elevation 188 of the gun. The kit also includes a separate hand-held targeting module 9C in the vicinity of the gun 140, measures the GUN TARGET RANGE 185A and GUN TARGET ELEVATION (Θ) 185B. The tethered system (including the kit, the M4 rifle 140 and the M320 grenade launcher 150) allows for an optimum engagement of a target 40' allowing for a defilade engagement 40A.

FIG. 7C2 depicts a three-module tethered kit with a handheld M320 grenade launcher 150 in a stand along configuration. The kit includes a sighting module 9A, a transmitter module 9B, and a targeting module 9C. The sighting module 9A includes an attached sighting unit 6G, that measures the GUN TARGET ELEVATION(Θ) 185B. The hand-held targeting module 9C also measures the GUN TARGET ELEVATION(Θ) 185B and GUN TARGET RANGE 185A. The transmitter module 9B is affixed to the grenade launcher 150. The tethered system (including the kit, the M320 grenade launcher 150) allows the grenadier 56' to fire and gain an optimum function against a Target 40' permitting a defilade engagement 40A.

FIG. 7D depicts a three-module tethered kit, with a sighting module 9A and a transmitter module 9B mounted to a standalone M320 grenade launcher 150 or an underslung grenade launcher 150. The sighting module 9A has a pivot 19, an elevation indicator 12F, and the transmitter module 9B has a fixed relationship mounted to the grenade launcher 150 or the rifle 140. The targeting module 9C is handheld by the grenadier 56' or assistant gunner (not depicted), the targeting module 9C has a wireless data connection 11A to the Sighting Unit 6G. The Sighting Unit 6G has a galvanic data connection 11B to the transmitter module 9B.

Figure 8A:
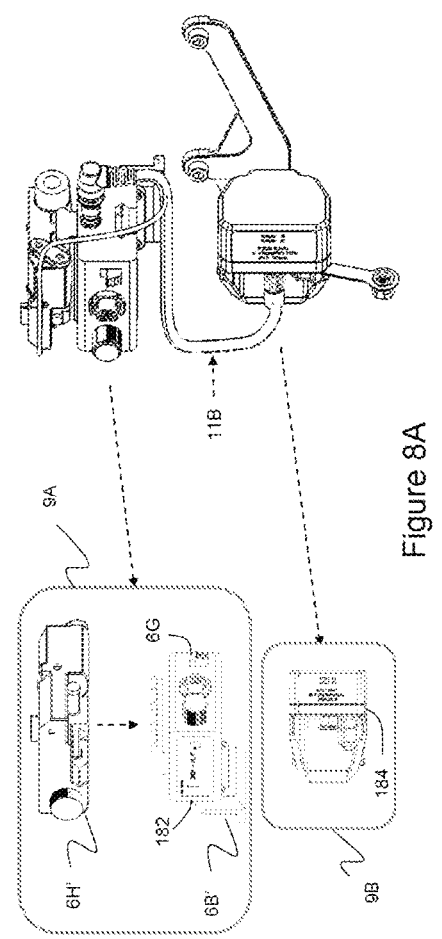
FIG. 8A depicts a tethered kit according to an example embodiment of the disclosed concept.

FIG. 8A depicts a two-module tethered kit including a sighting module 9A and a transmitter module 9B. The sighting module 9A includes a Sight Mount 6B' and a Sighting Unit 6G connecting to a Laser Range Finder 6H'. The transmitter module 9B is attached to the weapon. The kit is connected by a galvanic data connection 11B. The Sighting Unit 6G and the transmitter module 9B house inclinometer 182, 184.

FIG. 8B depicts a sighting module 9A including a Sighting Mount 6B' with a pivot 19, attachment points 6C' on a Sight Mount 6B' and a Sighting Unit 6G, and a Laser Range Finder 6H' and Aim Optic 7.

FIG. 8C1 depicts a two module tethered kit, mounted on a stand along M320 grenade launcher 150 with an affixed transmitter module 9B structured to measure the SLANT ANGLE (Θ) 186B of the grenade launcher 150 vis a vis the Target 40'. A Laser Range sub-system 6H' is affixed to the Sighting Unit 6G. The Sighting Unit 6G provides the grenadier 56' with a visual indicator 12F so the gunner 56' is able to manually depresses the sighting device's sighting unit 6B' until the sighting unit 6G establishes a GUN TARGET ANGLE (Θ) 185B, so the weapon 150 is properly elevated at gun elevation angle 188 (Θ) and a programmable projectile 64' will detonate at a correct point 106' proximate to the target 40' allowing for an effective defilade engagement 40A.

FIG. 8C2 depicts a two-module tethered kit mounted on a grenade launcher 150. The kit includes a sighting module 9A and a transmitter module 9B. The transmitter including a Laser Range Finder 6H' determines the GUN-TARGET RANGE 185A to a Target 40' and a Sight Unit 6G, with a pivot 19 allows for measurement of the SIGHT-TARGET ANGLE (Θ) 186B. The diagram depicts the Tethered Kit's Sight Unit 6G and the transmitter module 9B galvanically connected 11B and the programmer 54 transmitting a programming telegram 53.

Figure 9:
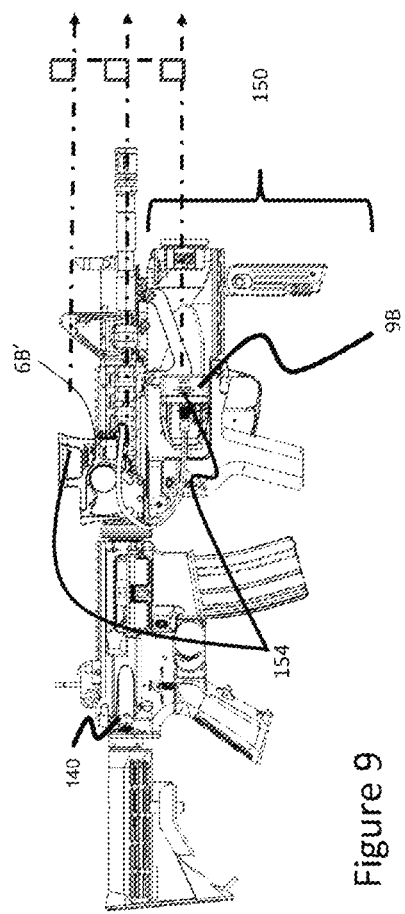
FIG. 9 depicts a small caliber rifle with a grenade launcher according to an example embodiment of the disclosed concept.

FIG. 9 depicts a small caliber rifle 140, a grenade launcher 150, a Sight Mount 6B'—a component of a Sighting module 9A, and a transmitter module 9B aligned in parallel to the grenade launcher 150 to allow for calibration of inclinometers (not depicted).

FIG. 10A depicts a system including a 40 mm grenade launcher 150 at a firing point 1 and a tethered fire control measuring GUN-TARGET RANGE 185A and SLANT RANGE 186A. In operation, the system's trigger detects the grenade's firing. A ballistic calculator 12A in a fire control unit 12,12A' then computes a time-to-detonate instruction in a wave form, the updated time of flight optimized for the engagement geometry SLANT RANGE 186A and SLANT ANGLE 186B, expressed as an optimum GUN ELEVATION 188. Thus, the system facilitates detonation (ABM function) with an optimum detonation location 106' with an optimum HEIGHT OF BURST (HOB) 106A'. As the programmable projectile 60 traverses an elevated trajectory 44', the projectile detonates 106' at a programmed time, ejecting effective fragmentation 74',108' rearward to a target 40' with an optimized height of burst 106A' for an optimum defiled defeat function 40A.

Figure 10B:
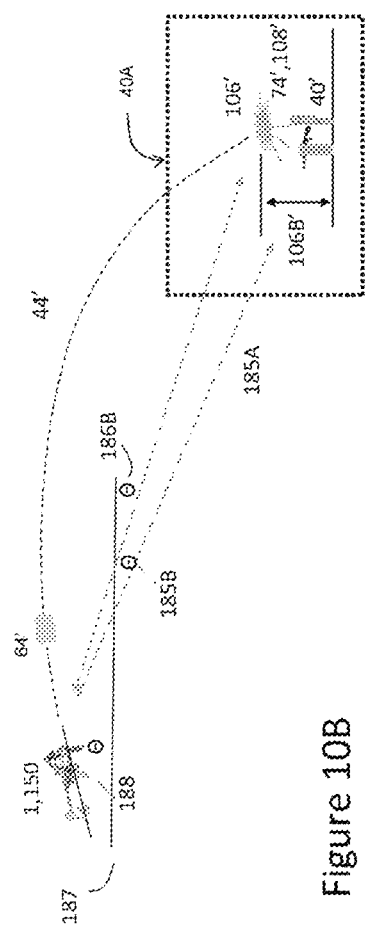
FIG. 10B depicts a 40 mm grenade launcher according to an example embodiment of the disclosed concept.

FIG. 10B depicts a 40 mm grenade launcher 150, at a firing point 1, firing a projectile on a trajectory 44', with a GUN-TARGET ANGLE (Θ) 185B, a ballistic solver calculating a SLANT ANGLE (Θ) 186B and providing for an GUN ELEVATION 0 solution 188 for a ABM projectile 64' on an depressed trajectory 44', the ABM projectile detonating and ejecting effective fragmentation 74',108' rearward to a target 40' with an optimized height of burst 106A' for an optimum terminal defeat function 40A.

Figure 11A:
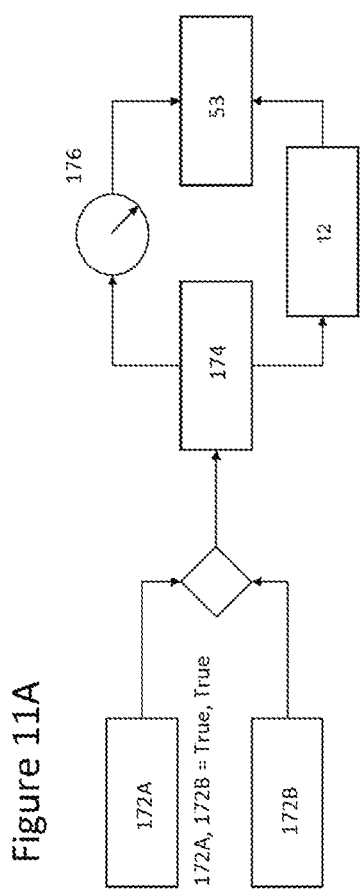
FIG. 11A depicts discriminating trigger sensor logic according to an example embodiment of the disclosed concept.

FIG. 11A depicts the discriminating trigger sensors 172A, 172B logic for software and firmware characterization for a programmable grenade's recoil, the trigger initiating reading of fire control input 174. Data from a ballistic calculator is read and formatted into a programming telegram 53 into a wave form for transmission to a grenade, post firing, at a programming station (see FIG. 5C or 12C, 48').

Figure 11B:
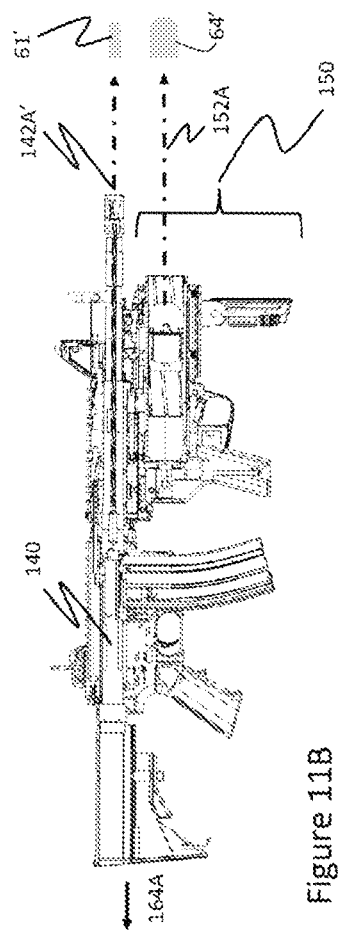
FIG. 11B depicts a rifle with a grenade launcher according to an example embodiment of the disclosed concept.

FIG. 11B depicts a cutaway image of a small caliber rifle 140 with an underslung grenade launcher 150, the rifle 140 firing a small caliber bullet 61' on the rifle barrel axis 142A', imparting recoil movement towards direction 164A. The grenade launcher's barrel axis 152A is identified.

FIG. 11C depicts key characterization a sensor's recoil 192,194 measured when firing both small caliber bullets 130 and grenades 60. A software or firmware filter can be used for a discriminating trigger using threshold filters 196,198 to isolate and identify a grenade's recoil amplitude 192B and duration 194B to prevent useless consumption of power in combat conditions, where sustained small arms fire could drain battery power.

FIG. 12A depicts an armored vehicle with a muzzle velocity radar 54D kit component, aligned to measure the muzzle velocity of a programmable projectile 64D' traveling on a trajectory in the microwave beam 48E intersecting the projectile's ballistic flight.

Figure 12B:
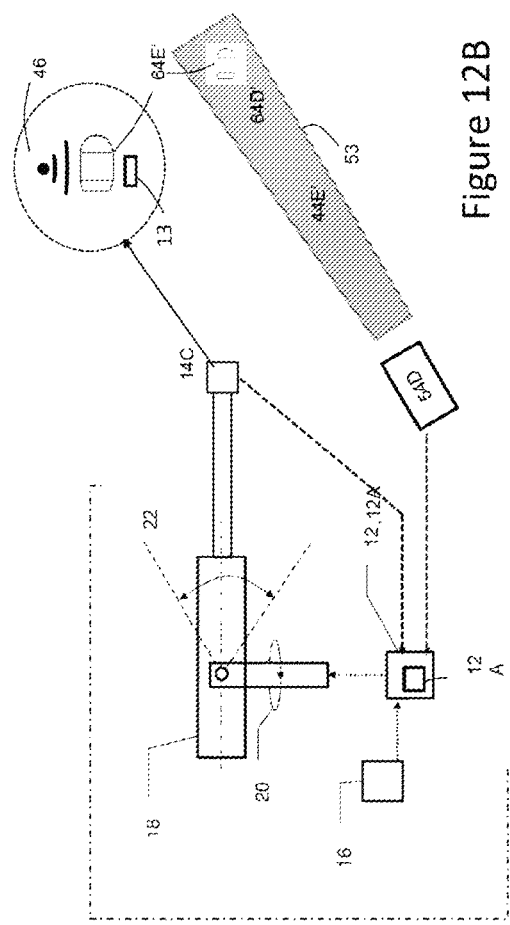
FIG. 12B depicts a system function diagram according to an example embodiment of the disclosed concept.

FIG. 12B is a system function diagram showing a Microwave Programmable Air-Burst Projectile 64D' with a unique RFID identifier 64E'. An RFID reader 13 is housed in a muzzle break 14C with a projectile muzzle velocity measurement and programing system 54D connected to a fire control unit 12, modulating a microwave emission 53 received by a microwave programmable projectile 44E', 64D' with a unique identifier 64E' at a programming station (e.g., a programming station 48' of FIG. 12C).

FIG. 12C depicts a projectile 64E' in transit (e.g., leaving a barrel 14 of a weapon as shown by the bracket) entering a programming station 48' according to an example embodiment of the disclosed concept. The projectile 64E' with unique readable tag 46', the unique projectile identification 11 read by a reader 13 at muzzle exit 14C, where the programmable projectile 60, 64', 64D',64E' subsequently exits the barrel 14. The use of this additional RFID security feature allows users to kit weapon system so that each projectile 60,64',64D',64E' is individually programmed to function while in flight closing on a target 44'.

FIG. 12D depicts reflected microwave emissions 52D according to an example embodiment of the disclosed concept. FIG. 12D shows the microwave reflectance return signal (radar return) 52D, allowing for measurement of a projectile's velocity 52H over a time duration 52I with an intermediate emission 53A. The intermediate emission 53D includes an embedded modulation that contains an interlaced programming emission.

Several companies such as L3 Harris, Rheinmetall, Optics 1 and Bushnell have developed modular laser range finders with data ports, designed to fit to Picatinny Rails, and provide range data to fire-control devices.

An embodiment according to the disclosed concept includes a distributed system (e.g., a kit) including at least a sighting module 9A and a transmitter module 9B. The is affixed (e.g., without limitation, electrically tethered 11B) to a grenade launcher 150. These modules or devices are optionally configurable to function with a $3^{rd}$ handheld targeting module 9C having a wireless data link 11A. The sighting module 9A includes a sighting mount 6B' with a pivot 19 and has a mounting interface 7A in the form of an attachment point 6C', preferably a MIL-STD 1913 Picatinny Rail, to which grenadiers 56' can affix (1) a Sighting Unit 6G with an inclinometer 182, (2) optionally, an optic 7, (3) a laser pointer, or (4) a laser range finder 6H'. The sighting module 9A has at least two core components: (1) Sighting Mount 6B' with a pivot 19, and a (2) Sighting Unit 6G that has a ballistic calculator 12'. The Sighting Unit 6G provides a graphic indicator, or user cue 12E, 12F that visually assists the grenadier 56' in precisely elevating the Grenade Launcher 150 to a correct SLANT ANGLE (Θ) 186B. In use, the sighting mount's pivot 19 allows the gunner 56' to manually rotate and physically adjust the fire control mount 6B' and other attached components 6G, 6H', 7 such that gunner 56' can continuously observe a visual grenade launcher elevation indicator, or cue 12E', 12F'. The transmitter module 9B includes an inclinometer 184 and is aligned and fixed to the grenade launcher 150 so as to allow the inclinometer 184 to provide a continuous SLANT ANGLE (Θ) 186B data feed to the Sighting Unit 6G in the Sighting module 9A. Data is transferred between the two tethered kit's devices 9A, 9B, via an electronic tether, allowing the fire control unit 12 to calculate an Elevation Adjustment 12F that verifies that the grenade launcher 150 has achieved a correct SLANT ANGLE (Θ) 186B to effectively fire a programmable projectile 64' for optimum terminal effect. Thus, when the gunner 56' or assistant gunner 58' ranges the target 40' obtaining the GUN-TARGET RANGE 185A and aims grenade launcher 150, the grenadier 56' may view the display 8' on the sighting unit 6G and observe a visual cue 12F that identifies to the grenadier 56' an optimized GUN TARGET ANGLE (Θ) 185B. The grenadier 56',58' may then aim and precisely fire a programmable projectile 64' from the grenade launcher 150, using the optimized GUN TARGET ANGLE (Θ) 185B and programming computations for an air-burst terminal effect 40A. Upon firing the programmable projectile 64', a programmer 54 in the transmitter module 9B fixed to the weapon 150 emits a telegram 53 after the projectile exits the barrel, such that the program telegram 53 optimizes the projectile's detonation location 106' and the terminal effect 40A of a detonation point 106' as the programmable projectile 64' traveling on a trajectory 44' functions in a close proximity to a target 40'.

When a three-module kit (as depicted in FIGS. 5A, 5B) is fit to a 40 mm Automatic Grenade Launcher 150 (as depicted in FIGS. 5C and 5D), the distributed system has a capability to fire a 40 mm×53 mm high velocity programmable ammunition 64' as an assistant gunner 58' locates Targets with a Targeting module 9C. The targeting module 9C then transmits data via a wireless transmission 11A to the Fire Control unit 12 so that the Sight Unit's 6H' displays 8' a preliminary visual cue 12Em, allowing the Grenadier 56 to manually depress the sight mount 6B' and attached components so that an inclinometer 182 in the Sighting Unit 6G can measure a GUN-TARGET ANGLE (Θ) 185B. As the Grenade Launcher 150 is elevated to a correct SLANT ANGLE (Θ) 186, inclinometers 184 measure the grenade launcher's elevation and a updated visual cue 12F is viewed by the Grenadier 56'. When firing the Grenade Launcher 150, the electronic trigger sensor initiates a sequence of electronic actions such that, after a short delay, a programming telegram 53 is transmitted. The trigger sensor initiates electronic actions that are undertaken by the fire control's ballistic calculator 12A' using the measured GUN-TARGET RANGE 185A, SLANT ANGLE (Θ) 186B, and Ammunition Type to calculate an optimum time-to-detonate function. The fire control 12,12A' with ballistic calculator 12A may utilize stored Data Histogram 12B (e.g., memory in the fire control), formatting and emitting a time-to-detonate programming telegram 53 precisely updated to initiate detonation by using the programmable projectile's measured exit velocity. After undertaking the post triggering electronic computing set forth in FIG. 11A, and with a requisite delay 176 to allow the programmable projectile 64' to transit from the barrel's muzzle 14C to a programming station 48' forward (e.g., toward the muzzle) of the barrel, transmitter module 9B emits an electronic programming telegram 53 that is received by the programmable projectile 64'.

When a two-module tethered kit (as shown in FIGS. 6A and 6B) are fit to a 40 mm Automatic Grenade Launcher 150 firing 40 mm×53 mm high velocity programmable ammunition 64' (as depicted in FIGS. 6C and 6D), the gunner 56' aligns the Sighting Mount 6B' with the target 40' for measuring the GUN-TARGET RANGE 185A. In this configuration, the Sighting Unit 6G displays a preliminary visual cure 12E for a GUN-TARGET ANGLE (Θ) 185B. The Grenadier 56' then manually pivots and depresses the sight mount 6B' to obtain a correct GUN-TARGET ANGLE (Θ) 185B. This movement adjusts input data received from inclinometers incorporated into a Sighting Unit 6G and the transmitter module 9B and the Fire Control Computer's Ballistic Calculator 12A computes a revised SLANT ANGLE (Θ) 186B. In computing the revised elevation cue or indicator 12F, the fire control ballistic calculator 12A may utilize a Data Histogram, formatting and presenting a visual cue 12F. After the grenadier 56' triggers the weapon, the Fire Control Unit 12 senses triggering of the weapon, formats a telegram for transmission and after a momentary delay 176 emits a time-to-detonate programming telegram 53 that is precisely updated to a "time-to-detonate" instruction. In certain circumstances, where the system has a muzzle velocity measurement system 50, the Fire Control Unit 12 also utilizes the programmable projectile's unique measured exit velocity in producing a unique time-to-detonate instruction that is formatted into the telegram 53.

When a three-module kit (as shown in FIGS. 7A and 7B) is attached to a hand-held grenade launcher such as a 40 mm US M320 grenade launcher 150 as depicted in FIGS. 7C and 7D, the system effectively fires LV 40 mm programmable ammunition 64'. An assistant grenadier 58' near the grenadier 56' typically uses a targeting module 9C to measure the GUN-TARGET RANGE 185A and GUN-TARGET ANGLE (Θ) 185B, transferring data to the fire control unit 12 via a wireless data link 11A. The data transmitted by wireless data link 11A is processed and provides a preliminary visual cue 12E assisting the grenadier 56' to subsequently align the Sighting Unit 6G with a correct, precise a SLANT ANGLE (Θ) 186B. To align the Sighting Unit 6G, the Grenadier 56' manually depresses the Site Mount 6B' so as to obtain a correct GUN-TARGET ANGLE (Θ) 185B. The inclinometer in the transmitter module 9B measures the Grenade Launcher's elevation, providing elevation data to the Fire Control unit's Ballistic Computer 12A by a galvanic tether 11B. In this configuration, an inclinometer 182 is typically incorporated into the sighting unit 6G and the transmitter module 9B is also fit with an inclinometer 184.

When two modules 9A and 9B are kitted to a hand held grenade launcher such as a 40 mm US M320 Grenade Launcher 150 as depicted in FIGS. 8C1 and 8C2, the distributed system is capable of effectively firing 40 mm LV Programmable Ammunition 64'. In this configuration the Gunner 56' aligns the Target 40' in an aiming optic 7, where Sight Unit 6G components are attached at attachment points 6C' on a Sighting Mount 6B'. The Sight Mount 6B' allows for manual pivoting, and depression of the components 6G, 6H' about a pivot 19 allows the grenadier 56' to obtain a correct GUN-TARGET ANGLE (Θ) 185B. Inclinometers 184 incorporated into the transmitter module 9B provides elevation data to a Fire Control Computer 12A in the Sighting Unit 6G via a galvanic tether 11B. The Sight unit 6G provides adjustment cues 12E, 12F to the grenadier 56', allowing the grenadier 56' to correctly elevate the Grenade Launcher 150 to a correct SLANT ANGLE (Θ) 186B. Upon triggering of the Grenade Launcher 150 and set-back of the cartridge, the tethered system's electronics generate and transmit a programming telegram 53. Additionally, in this configuration, an inclinometer 182 is incorporated into the Sighting Unit 6G and a programmer 54 affixed to the grenade launcher 150 includes a $2^{nd}$ inclinometer 184, both sensors 182,184 transferring data to the fire control module 6G, allowing the Fire Control Ballistic Computer 12A' to present adjustment cues 12F.

In a configuration where a grenade launcher 150 is underslung a rifle 140, it is useful to utilize a tethered kit that preserves power and precludes false program telegram emission 53. Such kit allows for the incorporation of an electronic discriminating programming trigger into a sighting module 9A and a transmitter module 9B mounted on the rifle 140 or Grenade Launcher 150. With the electronic discrimination programming trigger, the kit has a capability to distinguishing between the recoil energy 192A, 192B and duration 194A, 194B caused by small caliber fire 61 and the firing of a programmable projectile 64', using filter logic as set forth in FIG. 11A. In this embodiment, an electronic filter triggers data processing to form a Data Formatting Command 174, deriving a "Time-to-Detonate" solution from a Fire Control Ballistic Calculator 12A and emitting a programming telegram 53 with a momentary delay 176.

An alternate embodiment of the kit can be adapted and incorporated into remote weapon stations as depicted in FIGS. 12A and 12B where a microwave emitter 52A is aligned so that an aperture or cone of microwave emission 44E' is reflected from the programmable projectile 64' and allows for measurement of the projectile's exit velocity 52H, such that inclinometers tethered and electronically connected to a fire control sensors measures GUN-TARGET ANGLE (Θ) 185B, SLANT RANGE 186A, SLANT ANGLE (Θ) 186B and GUN ELEVATION(Θ) 188. The fire control 12 calculates a programming solution. The tethered system subsequently emits a detonation instruction 52E to a programmable projectile 64E' in flight. It can be useful to incorporate into a programmable projectile 64' a unique identifier 46' that is read in a muzzle break 15 by an RFID reader 13, and then unique identifier is re-utilized as a unique programming key 52F, formatted into a programming telegram 52E specifically transmitted to the projectile 64D' in ballistic trajectory 44' enveloped in an emission cone 48E'. In some example embodiment, a microwave muzzle velocity measurement system (e.g., without limitation, an MV measurement device 50) includes a projectile measurement sensor 52 structured to read a unique identifier of a programmable projectile 64', 64D', 64E' at muzzle exit and subsequently emit a unique programming telegram 53 to the programmable projectile in ballistic flight. The programmable projectile is structured to be programmed after the muzzle exit to detonate at a prescribed distance or time of flight. The programmable projectile is structured to be programmed to detonate on receipt of the unique programming telegram. In some example embodiment, a sensing system includes a discriminating trigger sensor 172 structured to fit to a grenade launcher underslung under a rifle and distinguish between firing of a grenade and firing of small caliber bullets. The sensing system may also include a fixed duration delay function structured to initiate a programming transmission to an air burst munition (ABM) projectile at a programming station 48' post barrel exit. The discriminating trigger sensor is structured to initiate a formatted programming telegram for an air burst munition (ABM) grenade upon detection of grenade recoil. The discriminating trigger sensor 172 precludes formatting and transmission of a programming signal upon detection of small arms recoil and conserve electrical power. In some examples, the discriminating trigger sensor 172 precludes formatting and transmission of a programming signal upon detecting small arms recoil and preempts inadvertent infrared (IR) optical programming emissions. A programming sub-system (e.g., without limitation, a transmitter module 9B, a programmer 54, etc.) of the system is structured to transmit a telegram using an optical or infrared emission. In some examples, a programming sub-system of the system is structured to transmit a telegram using a radio frequency (RF) emission. In some examples, a programming sub-system of the system is structured to transmit a telegram using an extended range magnetic induction emission. In some examples, a programming sub-system of the system is structured to transmit a telegram using a microwave emission.

As the US military has a desire to field weapons with new kits to program Air Burst Munitions (ABM) Ammunition, new kits according to the disclosed concept will provide improved aiming and engagement of designated battlefield targets, which are frequently in protected defilade positions on the battlefield. The kits may be affixed to weapons or turreted platforms for cannons. Typically, when engaging a target an assistant gunner 58' will identify targets and a weapon operator, also known as a gunner or grenadier 56' will correctly elevate the weapon's barrel firing the weapon. A tethered fire control functions by establishing a line of site (elevation, bearing and range) vector to a target. The task of locating a target is often undertaken by an assistant gunner 58' or grenadier 56' as pictured in FIGS. 4A, 4C, 4D, 4E and 4F or by a grenadier 56' operating a grenade launcher 150 where the grenade launcher 150 is fit with an aiming device 6B'.

Binoculars: Assistant grenadiers 58' may opt to use binoculars 6A', with sensors and a data link that the Binoculars functioning as a Targeting module 9C.

Aiming Optic or Sight: Alternatively, a gunner's kit may accommodate mounting or incorporation an aiming optic 7 or open site with an aiming display 8',12F.

Elevating the Barrel (Aiming): The Fire Control Ballistic Calculator 12A will use measured GUN TARGET RANGE 185A and GUN-TARGET ANGLE 185B (Θ) to compute an aiming solution 12E, 12F to present to the grenadier 56', so that grenadier 56' can raise or lower the grenade launcher 150 to a correct SLANT ANGLE 186B (Θ).

Fire Control Inputs and Computations: A tethered kit utilizes data input from sub-systems sensors utilizing data from (1) an inclinometer 182 in the Sighting Unit 6G, a core component in the Sighting module 9A, (2) an inclinometer 184 incorporated into a transmitter module 9B, GUN-TARGET RANGE 185A and GUN-TARGET ANGLE 185B (Θ) to calculate a correct aiming solution and an optimum time-to-detonate programming solution, formatted into a Programming Telegram 53.

A display 8' in the Sighting Unit 6G provides a visual cue 12F viewed by the Grenadier 56' so that the Grenadier 56' is able to elevate the grenade launcher 150 to a correct SLANT ANGLE 186B (Θ). When the Grenadier 56' fires the weapon to engage a target 40', the Grenadier 56' triggers the grenade launcher 150 to fire a programmable projectile 60 that travels along a correct trajectory 44' so that the programmable projectile 64' will detonate at a prescribed location 106' along the trajectory 44' to defeat a target 40'. The fire control's ballistic solver 12A utilizes as input GUN-TARGET RANGE 185A and GUN-TARGET ANGLE 185B. The fire control's ballistic calculator 12A calculates two outputs: (1) SLANT ANGLE 186B (Θ) and (2) a "time-to-detonate" solution. This "time-to-detonate" solution is formatted into a telegram 53 which is transmitted to a programmable projectile 64'. The Fire Control Ballistic Calculator 12A uses algorithms (e.g., without limitation, algorithm using measured muzzle velocity) to optimize the programmable projectile's terminal effects:

$$\text{SLANT ANGLE } (\Theta) \text{ 186B, "Time to Detonate"} = f(\text{GUN-TARGET RANGE 185A, GUN-TARGET } (\Theta) \text{ 185B}) abm \quad \text{EQ. 1}$$

Additionally, the fire control's ballistic calculator 12A may also utilize data input from a muzzle velocity sensor 50 to produce a refined aiming and programming telegram 53.

$$\text{SLANT ANGLE } (\Theta) \text{ 186B, "Time to Detonate"} = f(\text{MV Projectile 64', GUN-TARGET RANGE 185A, GUN-TARGET ANGLE } (\Theta) \text{ 185B}) abm \quad \text{EQ. 2}$$

where MV=Muzzle Velocity of an ABM projectile.

The forgoing algorithms utilize the specific ballistic properties of a programmable projectile 64' to process in a ballistic calculator 12A in a Fire Control Unit 12,12A', producing an improved airburst terminal effect 40A. The algorithms also provide the grenadier 56' with an optimized aiming elevation 12F. Upon firing a programmable projectile 64', the projectile transits to a programming station 48' and receives a telegram 53 and then the projectile continues on a ballistic trajectory 44' where it initiates detonation function 106 at a prescribed "time-to-detonate" so that the terminal engagement 40A produces an optimized Height of Burst 106A' at a prescribed detonation point 106'. In some cases, the Fire Control Ballistic Calculator 12A may utilize programmable projectile range tables stored in memory to process and produce a prescribed "time-to-detonate" output.

Triggering and Programming Air-Burst Munition (ABM) Function: For hand-held weapons it is useful to incorporate a discriminating trigger sensor 170 into one device 9A, 9B attached to the rifle 140, or grenade launcher 150 being a component in the tethered kit, a device having recoil sensors with requisite software/firmware that connects to the Fire Control Unit 12. Upon sensing small caliber recoil when the gunner 56' is firing a small caliber projectile 61, the low recoil measurement is electronically filtered 172A, 172B (False) so that emission of a telegram 53 is prevented. Upon sensing recoil when the gunner 56' is firing a larger, heavier projectile 64' such as a 40 mm grenade, the electronic trigger sensor (normally incorporated into a fire control unit 12) formats a telegram message 53 that includes a time-to-detonate instruction that is read by the programmable projectile 64'. The system provides for a short delay 176 between receipt of recoil impulse by the electronic trigger and emission of the telegram 53, allowing the programmable projectile 64' to transit the barrel and traverse to a programming station 48' forward of the muzzle. The programmer 54 then sends a telegram 53 to a programmable projectile 64' forward of the barrel 14A. The programming station 48' may be connected to or included in the programmer 54 of the transmitter module 9B. In some cases, the programming station 48' may be a virtual station wirelessly coupled to the transmitter module 9B and the projectile.

Microwave Programming: A combat vehicle with a cannon, as depicted in FIGS. 12A and 12B, is fit with a kit including a microwave emitter 52A intersecting and enveloping the projectile's ballistic trajectory 44', 44E' capable of first measuring a programmable projectile's muzzle velocity 52H over a time duration 52I, and subsequently emitting an interlaced programming signal 52E. To initiate a unique keyed programming signal, the projectile may utilize a unique identifier 64E', the identifier 46' read in the muzzle 15 by a RFID reader 13.

Command Detonate ABM Function: FIGS. 12A and 12B depict a turreted armored vehicle, firing a programmable medium caliber projectile 60, 64' where a microwave radar measures the muzzle velocity and target position and emits an interlaced electronic command to detonate, ejecting effective fragmentation 74',108' to a target 40'. Further, when firing in Command Detonate Mode, a projectile will transit the muzzle with a unique RFID tag that is read 13. The projectile has a unique identifier 46', typically reading a RFID tag 46'. Post barrel exit, the projectile will be flying in a continuous microwave radar emission 52D, and the emission will incorporate a digital interlaced programming signal 52E, that utilizes the projectile's unique identifier 52F as a key, creating a unique programming transmission and programming the projectile at a programming station 48' forward of the barrel 14.

Terminal ABM Function: FIGS. 10A and 10B illustrate a 40 mm grenade launcher 150 at a firing point 1, with a GUN-TARGET ANGLE (Θ) 185B at a GUN-TARGET RANGE 185A, firing a programmable 40 mm projectile 64' on an elevated and depressed trajectory 44, where a Programmable Projectile 64' functions to detonate at a prescribed time of flight, the detonation ejecting effective fragmentation 74', 108' to a target 40' with an optimized height of burst 106A'. The SLANT ANGLE (Θ) 185B and programmed time to detonate telegram 53, causing the projectile to detonate at an optimized effect location 106A' vis a vis the target 40'.

There has thus been shown and described a novel method and apparatus for improving the aim of a weapon, when firing either a point-detonating or a programmable air-burst projectile, that fulfills all of the objects and advantages sought therefor. Many changes, modifications, variations and other uses and applications of the subject invention will, however, become apparent to those skilled in the art after considering this specification and the accompanying drawings, which disclose the preferred embodiments thereof. All such changes, modifications, variations and other uses and applications which do not depart from the spirit and scope of the invention are deemed to be covered by the invention, which is to be limited only by the claims which follow.

LIST OF REFERENCE NUMBERS

Ground Mount Configuration
- 01 Firing Position
- 06 Binoculars
- 06A Binoculars with a data link
- 06' Fire Control (and sighting) Device
- 06A' Binoculars with a LRF and Data Link
- 06B' Sighting Mount
- 06C' Attachment Points for Sighting Module Components
- 06E' $2^{nd}$ sensor fixed and aligned to the Barrel
- 06F' Fire Control Module affixed to a sighting mount.
- 06G Sighting Module
- 06H' Laser Range Finder affixed to a sighting module component
- 07 Aim Optic
- 08' Dismounted Aim Data Display (indicator)
- 08 Dismounted Aim Data Display
- 09A Sighting Module
- 09B Programming Module
- 09C Targeting Module RWS Configuration
- 10 Remote Weapon Station
- 10' Remote Weapon Station or Turret
- 11 Data Link
- 11A Wireless
- 11B Galvanic
- 12 Fire Control Unit
- 12A Ballistic calculator in fire control
- 12A' Fire Control with a Ballistic Calculator
- 12B Memory (Histogram) in fire control
- 12C Algorithm or Table with assumed muzzle velocity
- 12D Algorithm using measured muzzle velocity
- 12E Preliminary Elevation Indicator
- 12F Adjusted Elevation Indicator
- 13 RFID tag reader
- 14 Barrel
- 14A 40 mm Barrel
- 14C Muzzle Break on Barrel Common Sub-Systems
- 16 (Human) Input Means
- 17 Human Physical Manipulation (of weapon elevation)
- 18, 18' Weapon Mounted on Mechanical Support
- 19 Pivot for a mount Spatial Position, Ballistics and Target Engagement
- 20 Azimuth
- 22 Elevation
- 22A Theoretical Elevation
- 22B Sensor Adjusted Elevation
- 22C Calibrated Alignment
- 26 Threat Detection System
- 40 Level Target
- 40' Target
- 40A Optimized Terminal Defeat Function, Defilade Engagement
- 41' Level Target
- 42' Elevated Target
- 42 Elevated Target
- 44 Trajectory
- 44' Projectile Trajectory
- 44$a$ Level Trajectory
- 44$b$ Elevated Trajectory
- 44$c$ Elevation Adjusted for Exit Velocity
- 44D' Time to Detonate Programming Wave Form
- 44E' Programmable projectile in ballistic flight enveloped in a focused microwave emission
- 44$mva$ Trajectory with a muzzle velocity 1 sigma less than the mean
- 44$mv0$ Trajectory with a muzzle velocity equal to the mean
- 44$mvb$ Trajectory with a muzzle velocity 1 sigma greater than the mean
- 44$mvi$ Improved Aim and Trajectory of $2^{nd}$ volley
- T1 Programmed Time 1 sans exit velocity measurement
- T2 Programmed Time 1 adjusting for measured projectile exit velocity
- P1 Probability of Missing a Target
- P2 Probability of Hitting a Target
- MV Mean Theoretical Muzzle Velocity Used by Fire Control
- 46' RFID tag emission from a programmable projectile
- 48' Programming Station
- 48E' Emission Cone, Microwave Beam Improved System Sequence of Operation
- V1 $1^{st}$ Volley using a theoretical muzzle velocity
- V2 $2^{nd}$ Volley using sensor measured muzzle velocity from $1^{st}$ volley
- V3 $3^{rd}$ Volley using sensor measured muzzle velocity from $2^{nd}$ volley New Sensors and Emitters
- 50 Muzzle Velocity Measurement Device
- 51 Microwave Muzzle Velocity Measurement and Programming System
- 52 Projectile Measurement Sensor
- 52A Muzzle Exit (Velocity)
- 52B Radar
- 52C Position Beacon
- 52D Microwave Emitter
- 52E Interlaced Programming Emission
- 52F Interlaced Data Field
- 52G Radar Reflection
- 52H Measured Projectile Velocity
- 52I Microwave Emission Time Duration
- 53 Programming Telegram
- 53A Interlaced Signal in Microwave Emission (was 52E)
- 53B Keyed Transmission using the projectile's unique RFID identifier (was 52F)
- 54 Programmer
- 54A Optical Programmer
- 54B RF or XMI Programmer
- 54C AHEAD Type Programmer
- 54D' Microwave programmer and radar muzzle velocity measurement system
- 55 Attachment Point
- 56' Gunner operator of a crew served weapon or grenadier operating a hand-held grenade launcher.
- 58' Assistant Gunner sighting targets for a crew served weapon or a grenadier identifying targets for a grenadier operating a hand-held grenade launcher.

Projectile Programming Methodology
- 60 Projectile
- 61' Small Caliber Projectile
- 62 Conventional Projectile
- 64 Programmable Air-Burst Projectile
- 64' Programmable Grenade (Projectile)
- 64A Optically programmed air-burst projectile
- 64B RF or XMI programmed air-burst projectile
- 64C AHEAD type air-burst projectile
- 64D' Microwave Programmable Projectile 64E' Programmable Projectile with a unique RFID identifier
66 Unfired Ammunition Cartridge with a projectile
68 Ammunition Can or Package
70' Target
74' Fragmentation from a detonating projectile
106' Detonation Point
106A' Detonation HOB
106B' Time of Flight/Distance to Burst/Time to detonate
108' Effective defilade fragmentation thrown from the detonation point
110' Angle of Fall
130 Small caliber bullet in flight
140 Small caliber rifle
142 Small caliber rifle barrel
142A' Axis of small caliber barrel
150 Grenade Launcher
152 Oriented Trigger Sensor
152A' Axis of grenade barrel
154 Bore Sighted and Aligned Accelerometers
164A Small Cal Recoil Movement
164B Grenade Recoil Movement
170 Discriminating trigger filtering logic
172 Discriminating recoil sensor
172A Recoil Amplitude
172B Recoil Duration
174 Data Formatting Command
176 (Delay) clock function for programming transmission
182 Inclinometer in fire control and sighting device
184 Inclinometer in programmer (affixed to align with barrel)
184' Barrel Elevation
185A GUN-TARGET RANGE is the distance from a firing point to a designated target.
185B GUN-TARGET ANGLE (Θ) is the angle from the observer/spotter in the vicinity of the weapon to the target.
186A SLANT RANGE is the distance to an aerial burst point.
186B SLANT ANGLE (Θ) is the angle from the weapon to an aerial burst point.
187 Earth horizon, tangent to earth surface.
188 GUN ELEVATION (Θ) is the vertical angle between the horizontal plane and the axis of the bore and can also be called a SUPRELEVATION where the axis of the bore is elevated.

What is claimed is:

1. A distributed aiming and ammunition programming system, comprising:
a sighting device on a pivoting mount with attachment points for alignment of a sighting unit structured to measure gun-target elevation angle, the sighting unit including a visual cuing elevation feature and incorporating an inclinometer allowing for measurement of the gun-target elevation angle; and
a transmitter device fixed to a weapon and structured to measure an axis of elevation of the barrel of the weapon, wherein the sighting device and the transmitter device are digitally tethered and incorporate a ballistic measurement device and the tethered sighting device and the transmitter device are structured to (1) receive sensor input from sensing components of the system, (2) solve for an optimum aim elevation and height of burst for gun-target engagement, (3) perform system formatting and (4) transmit an optimum time-to-detonate digital telegram to a programmable projectile structured to be programmed forward of the muzzle of the weapon, and wherein a fire control unit of the system is structured to correct aim elevation of the weapon for shooting at a target above or below the horizon, wherein the fire control unit for an Air Burst Munition programmer uses an adjusting device structured to adjust the optimum time-to-detonate digital telegram based at least in part on adjusting programming time with a measured exit velocity.

2. The system of claim 1, wherein the fire control unit uses a modular ranging device affixed to a pivoting mount via a Picatinny rail.

3. The system defined in claim 1, wherein the sighting device is affixed to the weapon.

4. The system of claim 1, further comprising a handheld targeting device.

5. The system of claim 4, wherein the handheld targeting device comprises a binocular.

6. The system of claim 1, wherein the sighting device and the transmitter device are capable of being aligned with the inclinometer that is digitally tethered to the sighting device and the transmitter device.

7. A distributed aiming and ammunition programming system, comprising:
a sighting device on a pivoting mount with attachment points for alignment of a sighting unit structured to measure gun-target elevation angle, the sighting unit including a visual cuing elevation feature and incorporating an inclinometer allowing for measurement of the gun-target elevation angle; and
a transmitter device fixed to a weapon and structured to measure an axis of elevation of the barrel of the weapon, wherein the sighting device and the transmitter device are digitally tethered and incorporate a ballistic measurement device and the tethered sighting device and the transmitter device are structured to (1) receive sensor input from sensing components of the system, (2) solve for an optimum aim elevation and height of burst for gun-target engagement, (3) perform system formatting and (4) transmit an optimum time-to-detonate digital telegram to a programmable projectile structured to be programmed forward of the muzzle of the weapon, and wherein a fire control unit of the system is structured to correct aim elevation of the weapon for shooting at a target above or below the horizon, wherein the sighting device and the transmitter device are digitally tethered to each other via galvanic cables.

8. The system of claim 1, wherein in the sighting device and the transmitter device are digitally or electronically tethered to each other via a secure near field connection.

9. The system of claim 1, wherein the inclinometer is calibrated upon being mounted to the weapon.

10. A sensing system comprising:
a discriminating trigger sensor structured to fit to a grenade launcher underslung under a rifle and distinguish between firing of a grenade and firing of small caliber bullets; and
a fixed duration delay function structured to initiate a programming transmission to an air burst munition (ABM) projectile at a programming station, post barrel exit.

11. The system of claim 10, wherein the discriminating trigger sensor is structured to initiate a formatted programming telegram for the air burst munition (ABM) grenade upon detection of grenade recoil.

12. The system of claim 10, wherein the discriminating trigger sensor precludes formatting and transmission of a programming signal upon detection of small arms recoil and conserve electrical power.

13. The system of claim 10, wherein the discriminating trigger sensor precludes formatting and transmission of a programming signal upon detecting small arms recoil and preempts emittance of inadvertent electro-magnetic modulations comprising optical, infra-red, radio frequency or magnetic programming emissions.

14. The system of claim 10, wherein a programming sub-system of the system is structured to transmit a telegram using an extended range magnetic induction emission.

15. The system of claim 10, wherein a programming sub-system of the system is structured to transmit a telegram using a microwave emission.

* * * * *